US009426467B2

(12) United States Patent
Yamaguchi et al.

(10) Patent No.: US 9,426,467 B2
(45) Date of Patent: Aug. 23, 2016

(54) IMAGE DECODING METHOD USING A VERTICAL INVERSE TRANSFORM MATRIX AND A HORIZONTAL INVERSE TRANSFORM MATRIX

(71) Applicant: Kabushiki Kaisha Toshiba, Minato-ku (JP)

(72) Inventors: Jun Yamaguchi, Kawasaki (JP); Akiyuki Tanizawa, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 97 days.

(21) Appl. No.: 14/186,990

(22) Filed: Feb. 21, 2014

(65) Prior Publication Data

US 2014/0169461 A1    Jun. 19, 2014

Related U.S. Application Data

(63) Continuation of application No. 13/740,841, filed on Jan. 14, 2013, which is a continuation of application No. PCT/JP2010/062007, filed on Jul. 15, 2010.

(51) Int. Cl.
| | |
|---|---|
| H04N 7/12 | (2006.01) |
| H04N 19/61 | (2014.01) |
| H04N 19/593 | (2014.01) |
| H04N 19/44 | (2014.01) |
| H04N 19/122 | (2014.01) |
| H04N 19/11 | (2014.01) |

(Continued)

(52) U.S. Cl.
CPC ........ *H04N 19/00781* (2013.01); *H04N 19/44* (2014.11); *H04N 19/593* (2014.11); *H04N 19/61* (2014.11); *H04N 19/11* (2014.11); *H04N 19/12* (2014.11); *H04N 19/122* (2014.11); *H04N 19/186* (2014.11)

(58) Field of Classification Search
CPC ............................................... H04N 19/00781
USPC ...................................... 375/240.12
See application file for complete search history.

(56) References Cited

U.S. PATENT DOCUMENTS

| | | | |
|---|---|---|---|
| 2006/0177142 A1* | 8/2006 | Zhou | ............................. 382/248 |
| 2007/0121731 A1 | 5/2007 | Tanizawa et al. | |
| 2010/0208803 A1 | 8/2010 | Matsuo et al. | |

FOREIGN PATENT DOCUMENTS

| | | |
|---|---|---|
| EP | 2 200 324 A1 | 6/2010 |
| JP | 11-55678 | 2/1999 |
| JP | 2009-272727 | 11/2009 |

(Continued)

OTHER PUBLICATIONS

Office Action issued Jan. 13, 2015 in Japanese Patent Application No. 2014-189256 (with English language translation).

(Continued)

*Primary Examiner* — Richard Torrente
(74) *Attorney, Agent, or Firm* — Oblon, McClelland, Maier & Neustadt, L.L.P

(57) ABSTRACT

An image decoding method which includes decoding transform coefficients for a target image. A combination of a vertical inverse transform matrix and a horizontal inverse transform matrix corresponding to a target image is set. The transform coefficients are inversely transformed along a vertical direction and a horizontal direction using the combination which has been set to obtain a prediction error. The decoded image is generated using the prediction error.

1 Claim, 28 Drawing Sheets

(51) Int. Cl.
  *H04N 19/12* (2014.01)
  *H04N 19/186* (2014.01)

(56) References Cited

FOREIGN PATENT DOCUMENTS

| JP | 5259879 B2 | 8/2013 |
|---|---|---|
| JP | 2013-176110 A | 9/2013 |
| JP | 2014-171229 A | 9/2014 |
| JP | 5622954 B2 | 10/2014 |
| WO | WO 2008/157360 A2 | 12/2008 |
| WO | WO 2011/083573 | 7/2011 |

OTHER PUBLICATIONS

Extended European Search Report issued May 28, 2014 in Patent Application No. 10854722.5.
Extended European Search Report issued May 28, 2014 in Patent Application No. 14155176.2.
Office Action issued Jun. 10, 2014 in Japanese Patent Application No. 2014-085602 (with English language translation).
Office Action issued Jun. 18, 2014 in Australian Patent Application No. 2010357291.
Thomas Davies, et al., "Suggestion for a Test Model" Joint Collaborative Team on Video Coding (JCT-VC) of ITU-T SG16 WP3 and ISO/IEC JTC1/SC29/WG11, JCTVC-A033, XP 030007526, Apr. 2010, 30 pages.
Teruhiko Suzuki, et al., "Description of video coding technology proposal by Sony" Joint Collaborative Team on Video Coding (JCT-VC) of ITU-T SG16 WP3 and ISO/IEC JTC1/SC29/WG11, JCTVC-A103, XP 030007531, Apr. 2010, 51 pages.
Marta Karczewicz, "Improved Intra Coding" ITU-Telecommunications Standardization Sector Video Coding Experts Group (VCEG), VCEG-AF15, XP 030003536, Apr. 2007, 4 pages.
Thomas Wiegand, et al., "Overview of the H.264/AVC Video Coding Standard" IEEE Transactions on Circuits and Systems for Video Technology, vol. 13, No. 7, XP 011221093, Jul. 2003, pp. 560-576.
Office Action issued Jan. 21, 2014 in Japanese Patent Application No. 2013-082130 with English language translation.
Office Action issued Jan. 7, 2014 in Japanese Patent Application No. 2013-082131 (with English language translation).
International Preliminary Report on Patentability issued Feb. 21, 2013 in PCT/JP2010/062007 filed Jul. 15, 2010.
Written Opinion issued Oct. 12, 2010 in PCT/JP2010/062007 filed Jul. 15, 2010 submitting English language translation.
International Search Report issued Oct. 12, 2010 in PCT/JP2010/062007 filed on Jul. 15, 2010.
Ye et al., "Improved H.264 Infra Coding Based on Bi-Directional Intra Prediction, Directional Transform, and Adaptive Coefficient Scanning", 15$^{th}$ IEEE International Conference on Image Processing (ICIP 2008), IEEE, Oct. 2008, pp. 2116-2119 (in English).
Ye et al., "Improved Intra Coding", ITU-Telecommunications Standardization Sector Study Group 6, Document VCEG-AF11, Video Coding Experts Group (VCEG) 33$^{rd}$ Meeting: Shenzhen, China, Oct. 20, 2007, pp. 1-6 (in English).
Office Action issued Oct. 21, 2014 in Japanese Patent Application No. 2014-189256 (with English language translation).
Office Action dated Jul. 12, 2016 in corresponding Japanese Application No. 2015-075390, and English translation of relevant portions thereof.

\* cited by examiner

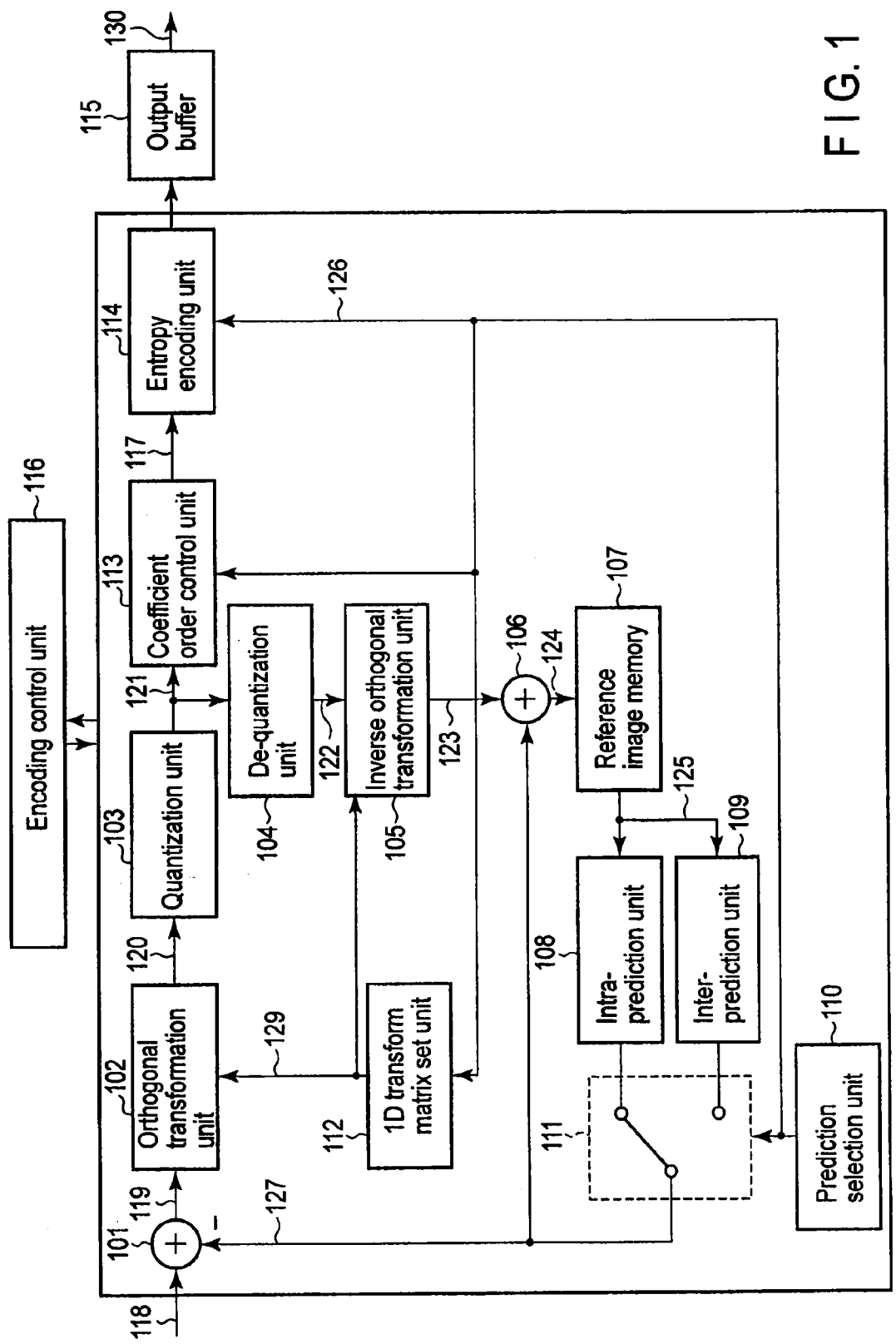
F I G. 1

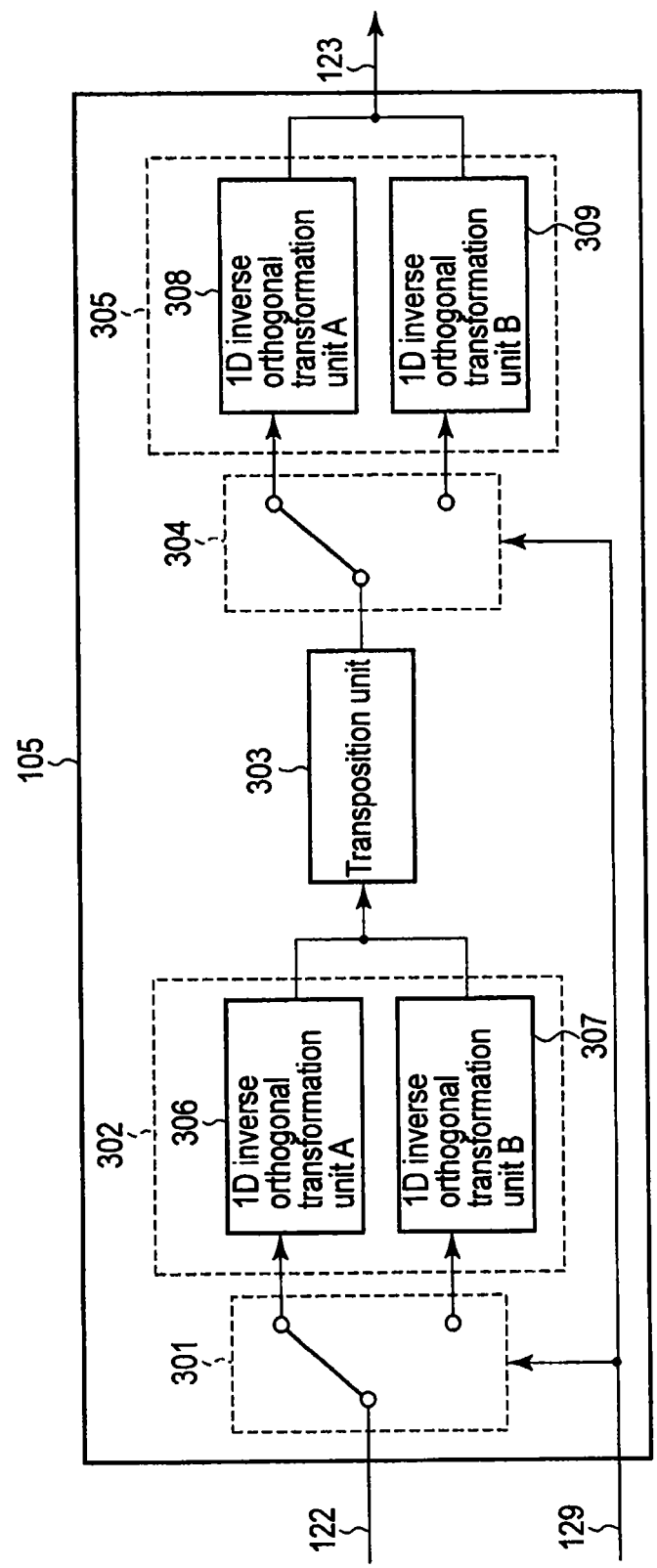
F I G. 3

| IntraNxNPredModeIndex | Name of IntraNxNPredMode | Vertical Transfom index | Horizontal Transfom index |
|---|---|---|---|
| 0 | Intra_NxN_Vertical | 0 | 1 |
| 1 | Intra_NxN_Horizontal | 1 | 0 |
| 2 | Intra_NxN_DC | 1 | 1 |
| 3 | Intra_NxN_Diagonal_Down_Left | 0 | 1 |
| 4 | Intra_NxN_Diagonal_Down_Right | 0 | 0 |
| 5 | Intra_NxN_Vertical_Right | 0 | 0 |
| 6 | Intra_NxN_Horizontal_Down | 0 | 0 |
| 7 | Intra_NxN_Vertical_Left | 0 | 1 |
| 8 | Intra_NxN_Horizontal_Up | 1 | 0 |

F I G. 4A

| Vertical Transform index | Name of Vertical Transform index |
|---|---|
| 0 | 1D_Transform_Matrix_A |
| 1 | 1D_Transform_Matrix_B |

F I G. 4B

| Horizontal Transform index | Name of Horizontal Transform index |
|---|---|
| 0 | 1D_Transform_Matrix_A |
| 1 | 1D_Transform_Matrix_B |

F I G. 4C

| TransformIdx | Vertical Transform index | Horizontal Transform index |
|---|---|---|
| 0 | 0 | 0 |
| 1 | 0 | 1 |
| 2 | 1 | 0 |
| 3 | 1 | 1 |

FIG. 4D

| IntraNxNPredModeIndex | Name of IntraNxNPredMode | Transform index |
|---|---|---|
| 0 | Intra_NxN_Vertical | 1 |
| 1 | Intra_NxN_Horizontal | 2 |
| 2 | Intra_NxN_DC | 3 |
| 3 | Intra_NxN_Diagonal_Down_Left | 1 |
| 4 | Intra_NxN_Diagonal_Down_Right | 0 |
| 5 | Intra_NxN_Vertical_Right | 0 |
| 6 | Intra_NxN_Horizontal_Down | 0 |
| 7 | Intra_NxN_Vertical_Left | 1 |
| 8 | Intra_NxN_Horizontal_Up | 2 |

FIG. 4E

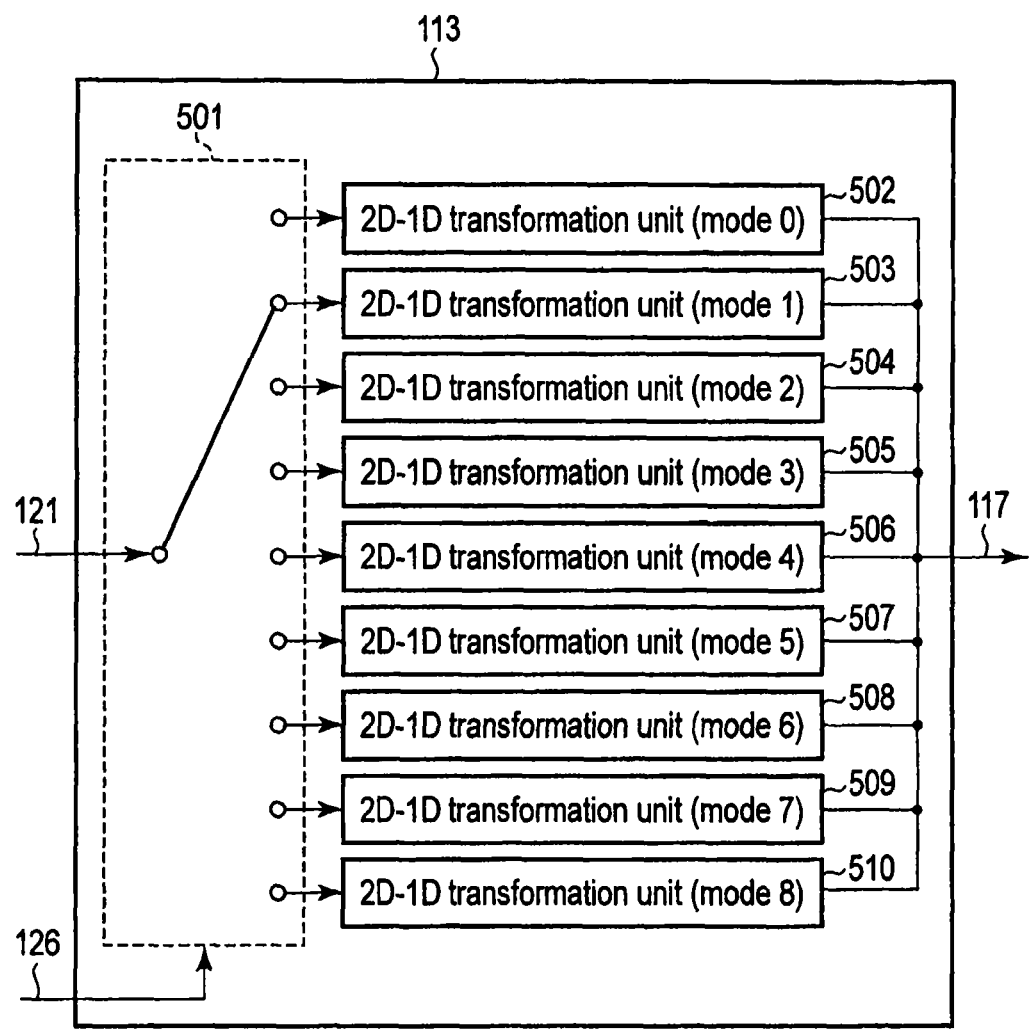
F I G. 5A

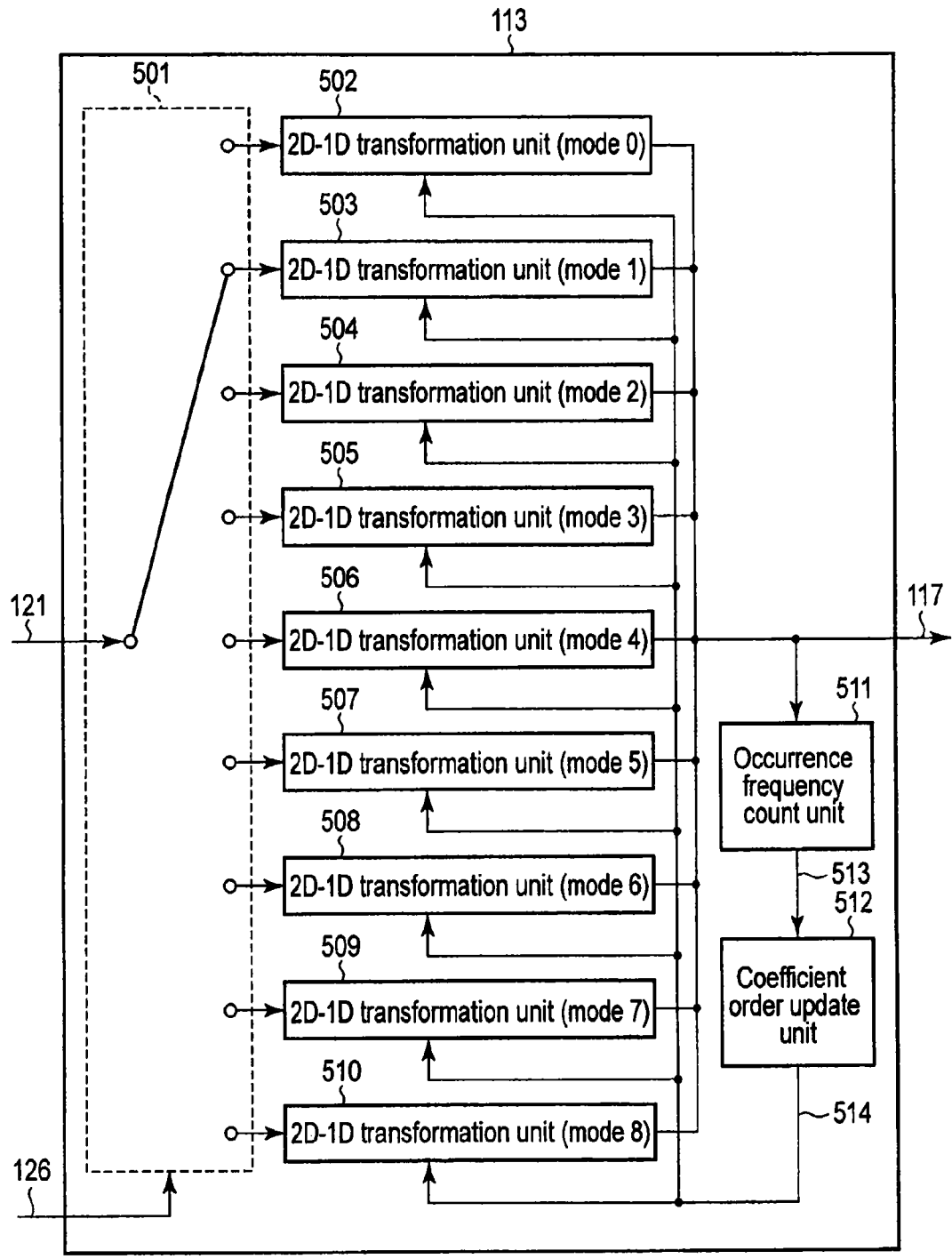
F I G. 5B

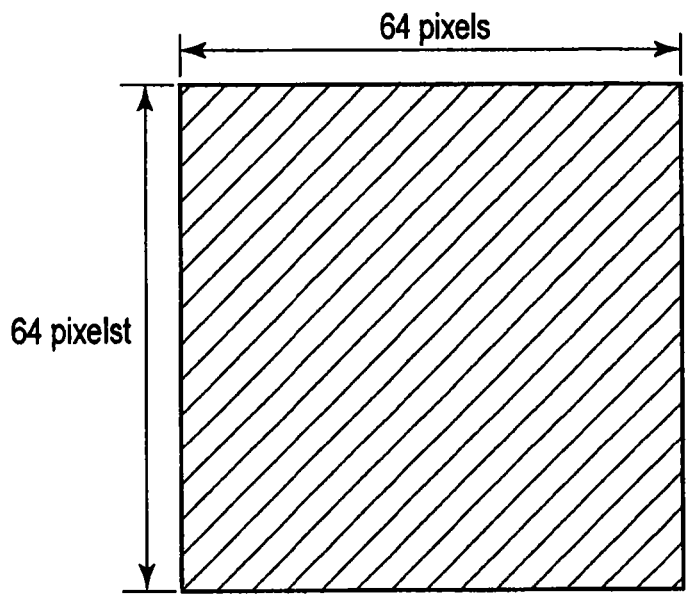
F I G. 6D
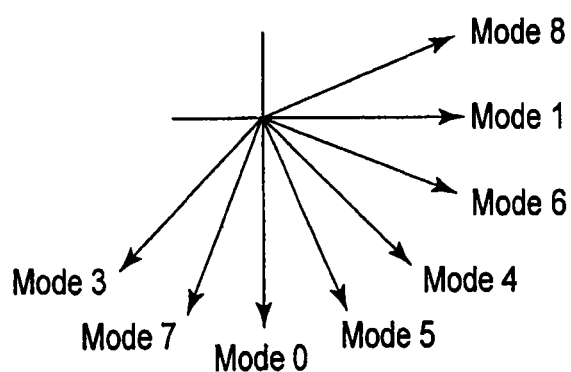
F I G. 7A

| M | A | B | C | D | E | F | G | H |
|---|---|---|---|---|---|---|---|---|
| I | a | b | c | d | | | | |
| J | e | f | g | h | | | | |
| K | i | j | k | l | | | | |
| L | m | n | o | p | | | | |

|       |     |     |     |     |     |     |     |     |     |     |     |     |     |     |     |     |
|-------|-----|-----|-----|-----|-----|-----|-----|-----|-----|-----|-----|-----|-----|-----|-----|-----|
| idx   | 0   | 1   | 2   | 3   | 4   | 5   | 6   | 7   | 8   | 9   | 10  | 11  | 12  | 13  | 14  | 15  |
| zig-zag | c00 | c01 | c10 | c20 | c11 | c02 | c03 | c12 | c21 | c30 | c31 | c22 | c13 | c23 | c32 | c33 |

F I G. 8A

F I G. 8B

F I G. 8C

| idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Intra_NxN_Vertical | c00 | c10 | c20 | c30 | c01 | c11 | c02 | c12 | c21 | c03 | c22 | c31 | c13 | c32 | c23 | c33 |
| Intra_NxN_Horizontal | c00 | c01 | c02 | c03 | c10 | c11 | c12 | c13 | c20 | c30 | c21 | c22 | c23 | c31 | c32 | c33 |
| Intra_NxN_DC | c00 | c10 | c01 | c11 | c02 | c20 | c12 | c30 | c21 | c03 | c22 | c13 | c23 | c31 | c32 | c33 |
| Intra_NxN_Diagonal_Down_Left | c00 | c10 | c01 | c11 | c02 | c02 | c21 | c12 | c22 | c03 | c13 | c30 | c23 | c31 | c32 | c33 |
| Intra_NxN_Diagonal_Down_Right | c00 | c10 | c01 | c11 | c02 | c20 | c21 | c12 | c22 | c03 | c13 | c30 | c23 | c31 | c32 | c33 |
| Intra_NxN_Vertical_Right | c00 | c10 | c20 | c01 | c11 | c21 | c02 | c12 | c30 | c31 | c22 | c03 | c13 | c23 | c32 | c33 |
| Intra_NxN_Horizontal_Down | c00 | c01 | c02 | c10 | c11 | c12 | c13 | c03 | c22 | c23 | c21 | c20 | c30 | c32 | c31 | c33 |
| Intra_NxN_Vertical_Left | c00 | c10 | c20 | c11 | c01 | c21 | c10 | c12 | c31 | c22 | c02 | c23 | c13 | c03 | c32 | c33 |
| Intra_NxN_Horizontal_Up | c00 | c01 | c02 | c11 | c12 | c03 | c10 | c13 | c22 | c23 | c21 | c20 | c31 | c30 | c32 | c33 |

FIG. 9

```
slice_header() {
...
    slice_directional_unified_transform_flag
...
}
```

```
coding_tree_unit() {
...
    if(slice_directional_unified_transform_flag && pred_mode==MODE_INTRA) {
        ctb_directional_unified_transform_flag
    }
...
}
```

FIG. 13

```
transform_unit() {
...
    if(slice_directional_unified_transform_flag && pred_mode==MODE_INTRA) {
        tu_directional_unified_transform_flag
    }
...
}
```

FIG. 14

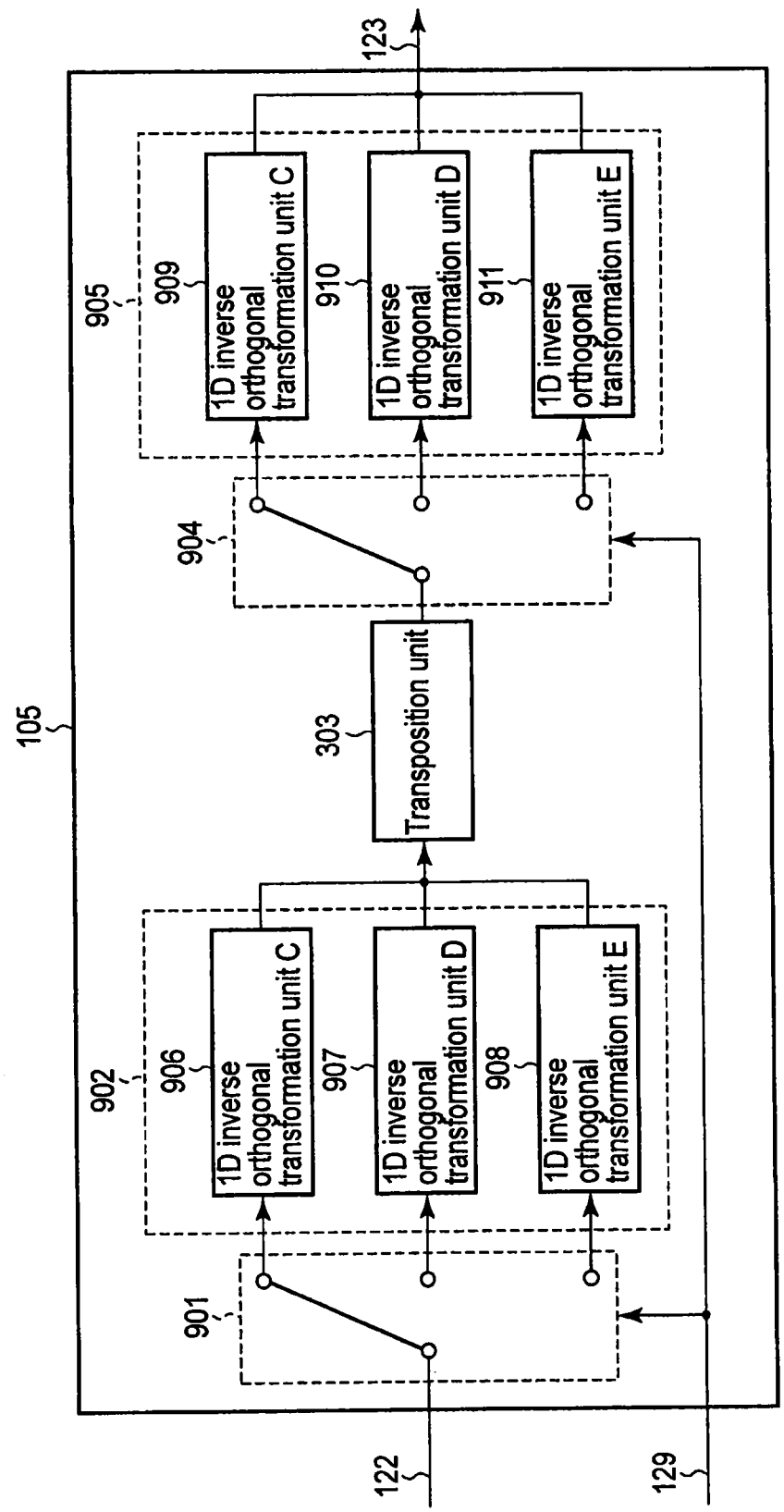
F I G. 17

| IntraNxNPredModeIndex | Name of IntraNxNPredMode | Vertical Transform index | Horizontal Transform index |
|---|---|---|---|
| 0 | Intra_NxN_Vertical | 0 | 1 |
| 1 | Intra_NxN_Horizontal | 1 | 0 |
| 2 | Intra_NxN_DC | 2 | 2 |
| 3 | Intra_NxN_Diagonal_Down_Left | 0 | 1 |
| 4 | Intra_NxN_Diagonal_Down_Right | 0 | 0 |
| 5 | Intra_NxN_Vertical_Right | 0 | 0 |
| 6 | Intra_NxN_Horizontal_Down | 0 | 0 |
| 7 | Intra_NxN_Vertical_Left | 0 | 1 |
| 8 | Intra_NxN_Horizontal_Up | 1 | 0 |

F I G. 18A

| Vertical Transform index | Name of Vertical Transform index |
|---|---|
| 0 | 1D_Transform_Matrix_C |
| 1 | 1D_Transform_Matrix_D |
| 2 | 1D_Transform_Matrix_E |

F I G. 18B

| Horizontal Transform index | Name of Horizontal Transform index |
|---|---|
| 0 | 1D_Transform_Matrix_C |
| 1 | 1D_Transform_Matrix_D |
| 2 | 1D_Transform_Matrix_E |

F I G. 18C

| TransformIdx | Vertical Transform index | Horizontal Transform index |
|---|---|---|
| 0 | 0 | 0 |
| 1 | 0 | 1 |
| 2 | 1 | 0 |
| 3 | 2 | 2 |

F I G. 18D

| IntraNxNPredModeIndex | Name of IntraNxNPredMode | Transform index |
|---|---|---|
| 0 | Intra_NxN_Vertical | 1 |
| 1 | Intra_NxN_Horizontal | 2 |
| 2 | Intra_NxN_DC | 3 |
| 3 | Intra_NxN_Diagonal_Down_Left | 1 |
| 4 | Intra_NxN_Diagonal_Down_Right | 0 |
| 5 | Intra_NxN_Vertical_Right | 0 |
| 6 | Intra_NxN_Horizontal_Down | 0 |
| 7 | Intra_NxN_Vertical_Left | 1 |
| 8 | Intra_NxN_Horizontal_Up | 2 |

F I G. 18E

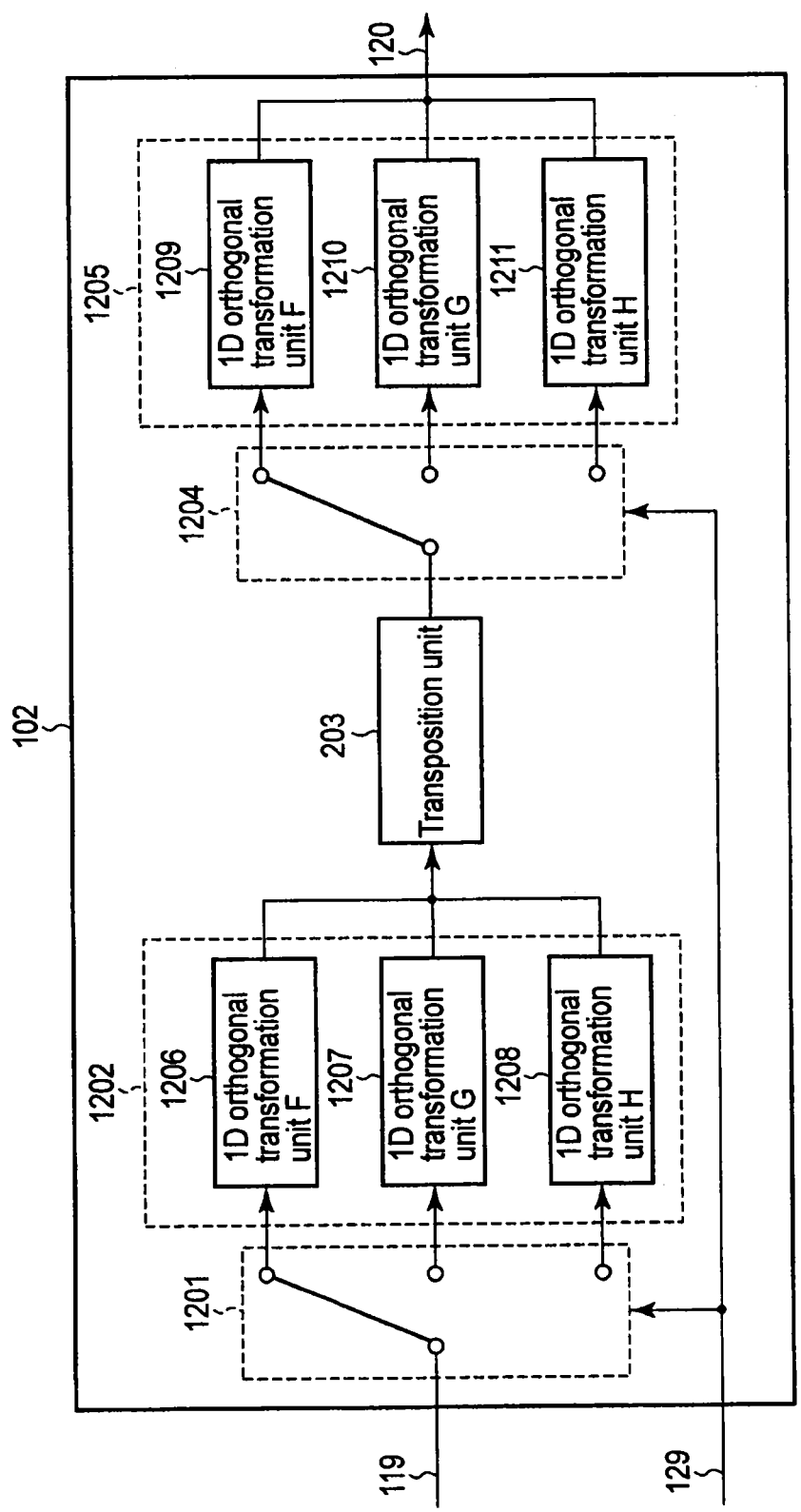
F I G. 19

| IntraNxNPredModeIndex | Name of IntraNxNPredMode | Vertical Transform index | Horizontal Transform index |
|---|---|---|---|
| 0 | Intra_NxN_Vertical | 0 | 1 |
| 1 | Intra_NxN_Horizontal | 1 | 0 |
| 2 | Intra_NxN_DC | 1 | 1 |
| 3 | Intra_NxN_Diagonal_Down_Left | 0 | 1 |
| 4 | Intra_NxN_Diagonal_Down_Right | 2 | 2 |
| 5 | Intra_NxN_Vertical_Right | 2 | 2 |
| 6 | Intra_NxN_Horizontal_Down | 2 | 2 |
| 7 | Intra_NxN_Vertical_Left | 0 | 1 |
| 8 | Intra_NxN_Horizontal_Up | 1 | 0 |

FIG. 21A

| Vertical Transform index | Name of Vertical Transform index |
|---|---|
| 0 | 1D_Transform_Matrix_F |
| 1 | 1D_Transform_Matrix_G |
| 2 | 1D_Transform_Matrix_H |

FIG. 21B

| Horizontal Transform index | Name of Horizontal Transform index |
|---|---|
| 0 | 1D_Transform_Matrix_F |
| 1 | 1D_Transform_Matrix_G |
| 2 | 1D_Transform_Matrix_H |

FIG. 21C

| TransformIdx | Vertical Transform index | Horizontal Transform index |
|---|---|---|
| 0 | 2 | 2 |
| 1 | 0 | 1 |
| 2 | 1 | 0 |
| 3 | 1 | 1 |

F I G. 21D

| IntraNxNPredModeIndex | Name of IntraNxNPredMode | Transform index |
|---|---|---|
| 0 | Intra_NxN_Vertical | 1 |
| 1 | Intra_NxN_Horizontal | 2 |
| 2 | Intra_NxN_DC | 3 |
| 3 | Intra_NxN_Diagonal_Down_Left | 1 |
| 4 | Intra_NxN_Diagonal_Down_Right | 0 |
| 5 | Intra_NxN_Vertical_Right | 0 |
| 6 | Intra_NxN_Horizontal_Down | 0 |
| 7 | Intra_NxN_Vertical_Left | 1 |
| 8 | Intra_NxN_Horizontal_Up | 2 |

F I G. 21E

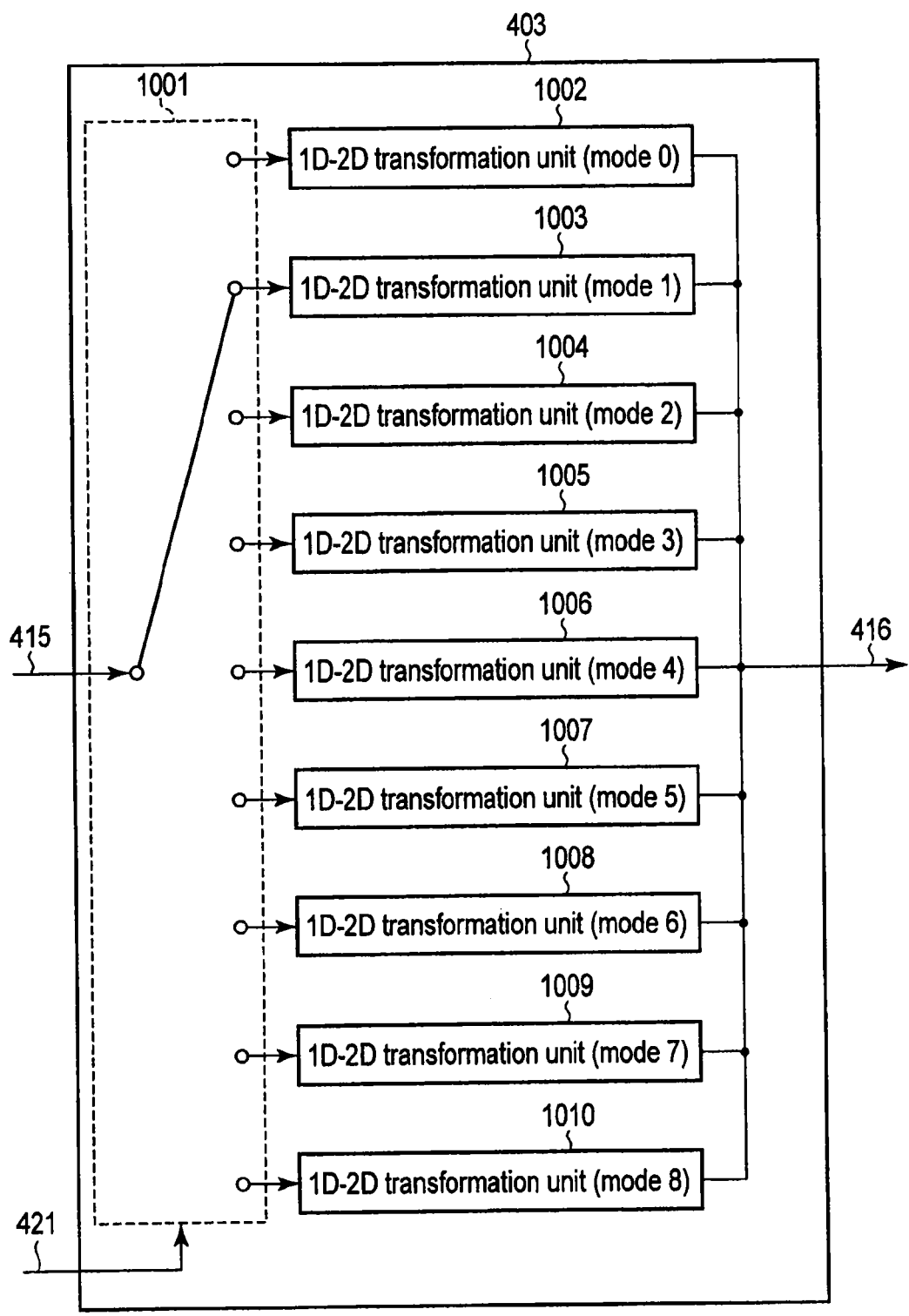
F I G. 23A

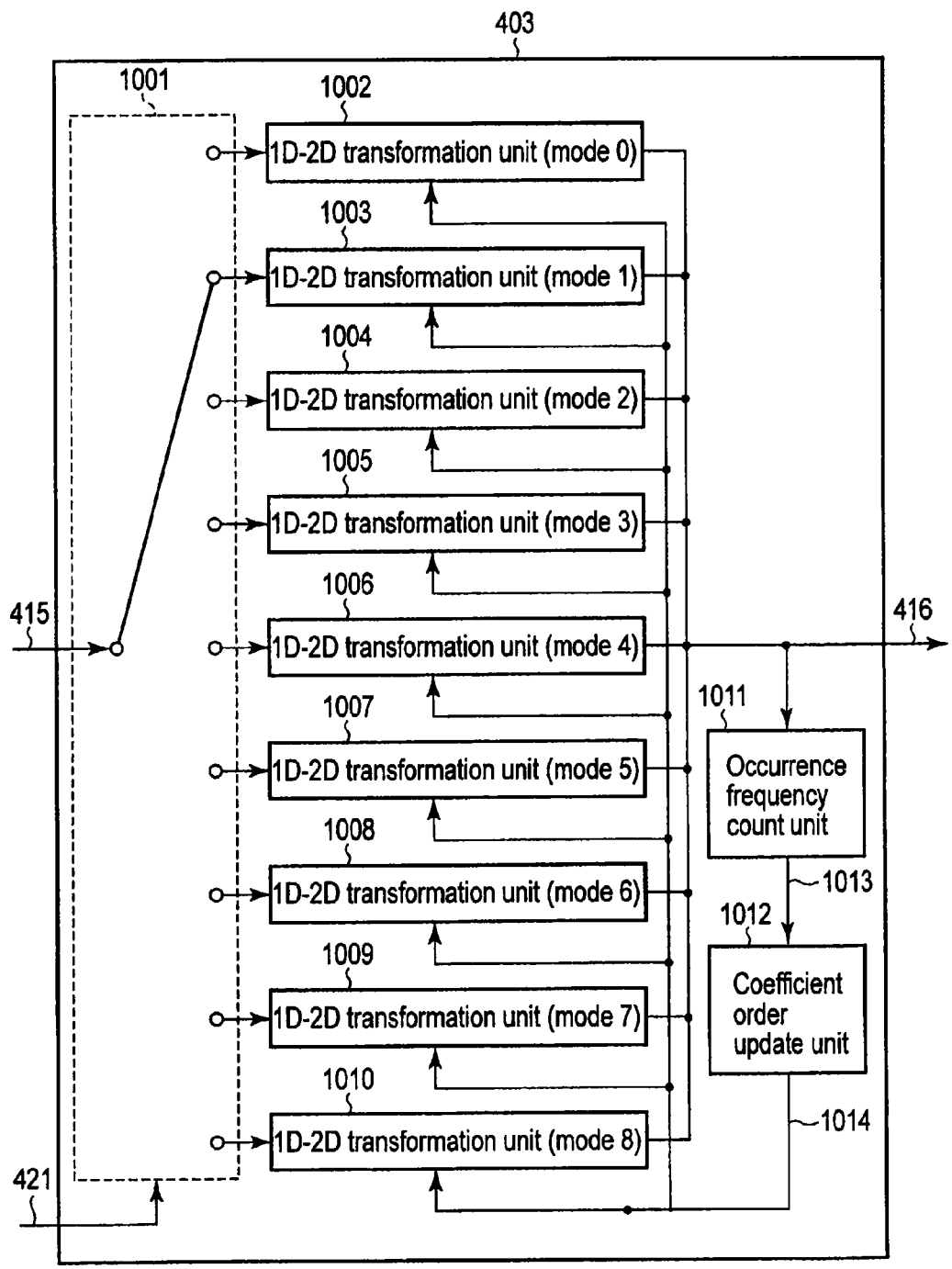
F I G. 23B

IMAGE DECODING METHOD USING A VERTICAL INVERSE TRANSFORM MATRIX AND A HORIZONTAL INVERSE TRANSFORM MATRIX

CROSS-REFERENCE TO RELATED APPLICATIONS

This application is a Continuation application of U.S. application Ser. No. 13/740,841, filed Jan. 14, 2013, which is a Continuation application of PCT Application No. PCT/JP2010/062007, filed Jul. 15, 2010, the entire contents of each of which are incorporated herein by reference.

FIELD

Embodiments described herein relate generally to orthogonal transformation and inverse orthogonal transformation in encoding and decoding of videos.

BACKGROUND

In recent years, an image coding method with significantly improved coding efficiency has been jointly recommended by ITU-T and ISO/IEC as ITU-T REC. H.264 and ISO/IEC 14496-10 (hereinafter referred as "H.264"). H.264 carries out discrete cosine transformation (DCT) and inverse discrete cosine transformation (IDCT) as orthogonal transformation and inverse orthogonal transformation on prediction errors in a target pixel block regardless of a prediction scheme applied to the target pixel block.

Extended H.264 is expected to carry out orthogonal transformation and inverse orthogonal transformation using individual transform bases for the respective nine types of prediction modes specified for intra-picture prediction (intra-prediction), thus improving the coding efficiency.

However, it is difficult, in connection with implementation, to carry out orthogonal transformation and inverse orthogonal transformation using individual transform bases for the respective plural types of prediction modes. For example, hardware implementation requires not only dedicated hardware for DCT and IDCT required for H.264 but also dedicated hardware for individual orthogonal transformations and inverse orthogonal transformations for the respective plural types of prediction directions. The addition of the dedicated hardware increases the scale of relevant circuits.

Software implementation enables not only DCT matrices but also individual transform matrices for the respective types of prediction directions to be loaded from a memory as appropriate and held in a cache memory as appropriate. In this case, the desired orthogonal transformation and inverse orthogonal transformation can be implemented by a general-purpose multiplier. However, disadvantageously, costs increase as a result of an increase in memory bandwidth or in cache memory size.

BRIEF DESCRIPTION OF THE DRAWINGS

FIG. 1 is a block diagram illustrating an image encoding apparatus according to a first embodiment.

FIG. 3 is a block diagram illustrating an inverse orthogonal transformation unit according to the first embodiment.

FIG. 4A is a table illustrating the correspondence between prediction modes and a vertical transform index and a horizontal transform index according to the first embodiment.

FIG. 4B is a table illustrating the correspondence between the vertical transform index and 1D transform matrices according to the first embodiment.

FIG. 4C is a table illustrating the correspondence between the horizontal transform index and 1D transform matrices according to the first embodiment.

FIG. 4D is a table illustrating the correspondence between a transform index and the vertical transform index and the horizontal transform index according to the first embodiment.

FIG. 4E is a table obtained by integrating FIG. 4A with FIG. 4D.

FIG. 5A is a block diagram illustrating a coefficient order control unit according to the first embodiment.

FIG. 5B is a block diagram illustrating the coefficient order control unit according to the first embodiment.

FIG. 6D is a diagram illustrating another example of the pixel block size.

FIG. 7A is a diagram illustrating an intra-prediction mode.

FIG. 7B is a diagram illustrating the arrangement relation between prediction target pixels and reference pixels.

FIG. 7C is a diagram illustrating an intra-prediction mode 1.

FIG. 7D is a diagram illustrating an intra-prediction mode 4.

FIG. 8A is a diagram illustrating a zigzag scan.

FIG. 8B is a diagram illustrating the zigzag scan.

FIG. 8C is a table showing a 2D-1D transformation utilizing the zigzag scan.

FIG. 9 is a table illustrating individual 2D-1D transformations for the respective prediction modes.

FIG. 13 is a diagram illustrating coding tree unit syntax.

FIG. 14 is a diagram illustrating transform unit syntax.

FIG. 17 is a block diagram illustrating an inverse orthogonal transformation unit according to the second embodiment.

FIG. 18A is a table illustrating the correspondence between the prediction modes and the vertical transform index and the horizontal transform index according to the second embodiment.

FIG. 18B is a table illustrating the correspondence between the vertical transform index and 1D transform matrices according to the second embodiment.

FIG. 18C is a table illustrating the correspondence between the horizontal transform index and 1D transform matrices according to the second embodiment.

FIG. 18D is a table illustrating the correspondence between the transform index and the vertical transform index and the horizontal transform index according to the second embodiment.

FIG. 18E is a table obtained by integrating FIG. 18A with FIG. 18D.

FIG. 19 is a block diagram illustrating an orthogonal transformation unit according to a third embodiment.

FIG. 21A is a table illustrating the correspondence between the prediction modes and the vertical transform index and the horizontal transform index according to the third embodiment.

FIG. 21B is a table illustrating the correspondence between the vertical transform index and 1D transform matrices according to the third embodiment.

FIG. 21C is a table illustrating the correspondence between the horizontal transform index and 1D transform matrices according to the third embodiment.

FIG. 21D is a table illustrating the correspondence between the transform index and the vertical transform index and the horizontal transform index according to the third embodiment.

FIG. 21E is a table obtained by integrating FIG. 21A with FIG. 21D.

FIG. 23A is a block diagram illustrating a coefficient order control unit according to the fourth embodiment.

FIG. 23B is a block diagram illustrating a coefficient order control unit according to the fourth embodiment.

DETAILED DESCRIPTION

Figure 2:
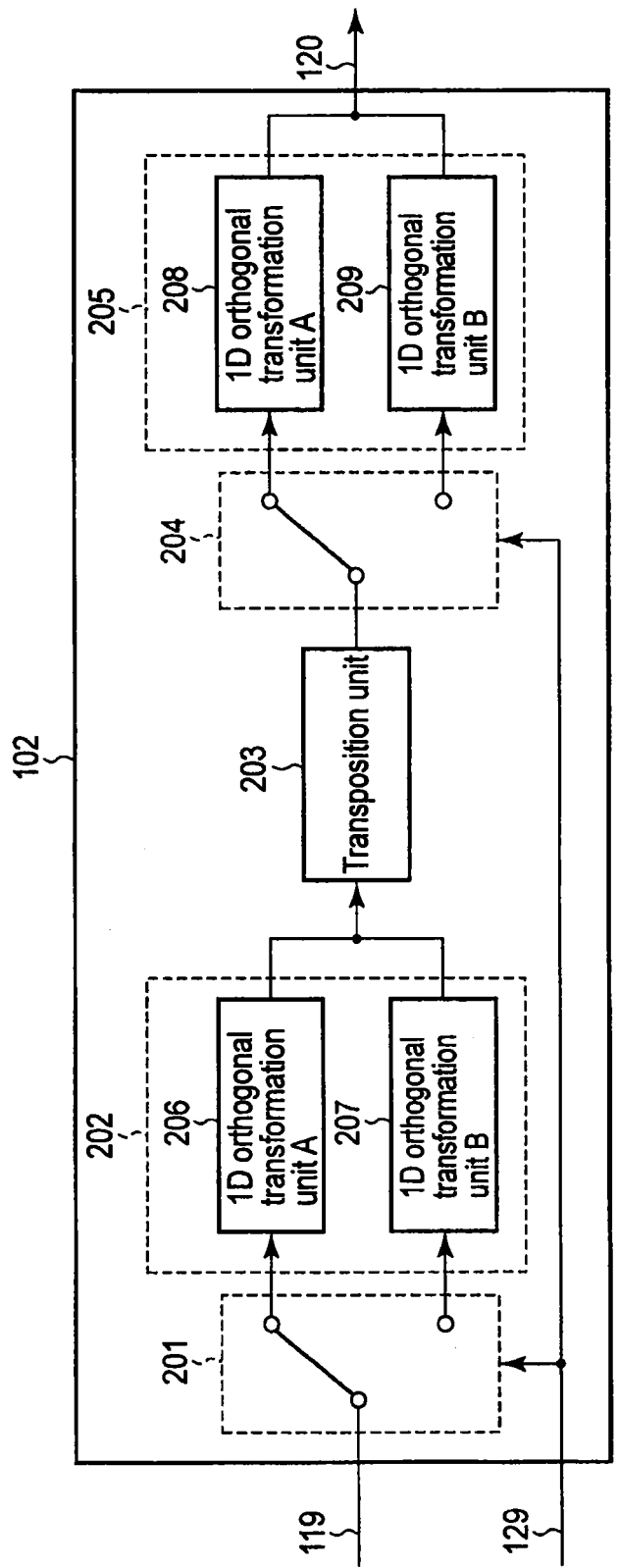
FIG. 2 is a block diagram illustrating an orthogonal transformation unit according to the first embodiment.

Embodiments will be described below with reference to the drawings.

In general, according to one embodiment, an image encoding apparatus includes an intra-prediction unit, a setting unit, a first transforming unit and an encoding unit. The intra-prediction unit predicts a prediction error of a target image to be encoded based on an intra-prediction mode. The setting unit sets a combination of a vertical transform matrix and a horizontal transform matrix corresponding to the target image based on a predetermined relation. The first transforming unit transforms the prediction error using the combination of the vertical transform matrix and the horizontal transform matrix, to obtain transform coefficients. The encoding unit encodes the transform coefficients and information indicating the intra-prediction mode for the target image. The combination includes any of a plurality of transform matrices including a first transform matrix and a second transform matrix which increases a coefficient density compared to the first transform matrix if a one-dimensional orthogonal transformation in a direction orthogonal to a line of a group of reference pixels on at least one line is performed on the prediction error in the intra-prediction mode in which the group of reference pixels is referenced to generate an intra-prediction image.

In the description below, the term "image" may be replaced with the term "image signal", "image data", or the like as appropriate.
(First Embodiment)

A first embodiment relates to an image encoding apparatus. An image decoding apparatus corresponding to the image encoding apparatus according to the present embodiment will be described in a fourth embodiment. The image encoding apparatus can be implemented by hardware such as LSI (Large-Scale Integration) chips, DSPs (Digital Signal Processors), FPGAs (Field Programmable Gate Arrays), and the like. Furthermore, the image encoding apparatus can also be implemented by allowing a computer to execute an image encoding program.

As shown in FIG. 1, the image encoding apparatus according to the present embodiment includes a subtraction unit 101, an orthogonal transformation unit 102, a quantization unit 103, a de-quantization unit 104, an inverse orthogonal transformation unit 105, an addition unit 106, a reference image memory 107, an intra-prediction unit 108, an inter-prediction unit 109, a prediction selection unit 110, a prediction selection switch 111, a 1D (one-dimensional) transformation matrix set unit 112, a coefficient order control unit 113, an entropy encoding unit 114, an output buffer 115, and an encoding control unit 116.

Figure 6A:
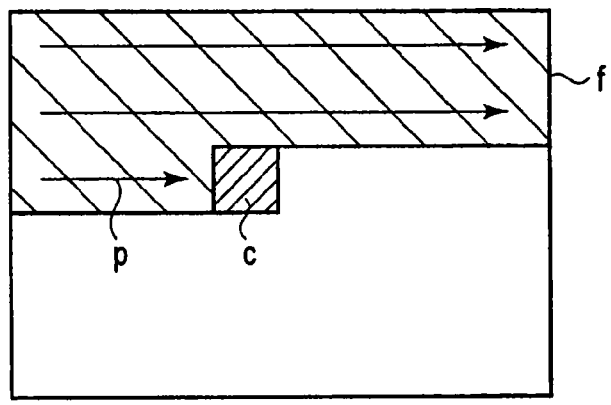
FIG. 6A is a diagram illustrating the order of predictive coding of a pixel block.

The image encoding apparatus in FIG. 1 divides each of the frame or fields forming an input image 118 into a plurality of pixel blocks, carries out predictive coding on the pixel blocks resulting from the division, and outputs encoded data 130. For simplification, predictive coding is hereinafter assumed to be carried out on a pixel block from upper left to lower right as shown in FIG. 6A. FIG. 6A shows a coding target frame f in which an encoded pixel blocks p are positioned to the left of and above a coding target pixel block c.

Figure 6B:
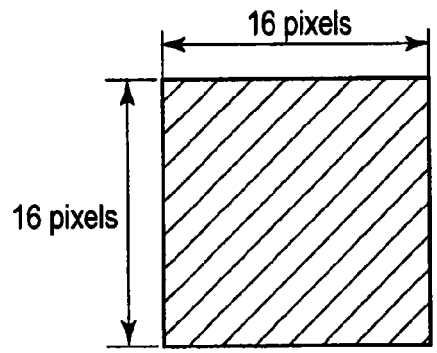
FIG. 6B is a diagram illustrating an example of a pixel block size.
Figure 6C:
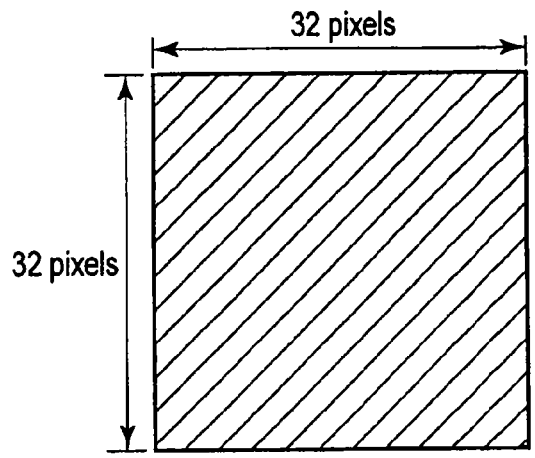
FIG. 6C is a diagram illustrating another example of the pixel block size.

Here, the pixel block refers to, for example, a coding tree unit, a macro block, a sub-block, or a pixel. The pixel block is hereinafter basically used to mean a coding tree unit but may be interpreted to have another meaning as appropriate. The coding tree unit is typically, for example, a 16×16 pixel block shown in FIG. 6B but may be a 32×32 pixel block shown in FIG. 6C, a 64×64 pixel block shown in FIG. 6D, or an 8×8 pixel block or a 4×4 pixel block not shown in the drawings. The coding tree unit need not necessarily be square. A coding target block or coding tree unit in the input image 118 is hereinafter sometimes referred to as a "prediction target block". Furthermore, the coding unit is not limited to the pixel block such as the coding tree unit but may be a frame, a field, or a combination thereof.

The image encoding apparatus in FIG. 1 carries out intra-prediction (also referred to as intra-frame, intra-frame prediction, or the like) or inter-prediction (also referred to as inter-picture prediction, inter-frame prediction, or the like) to generate a predicted image 127. The image encoding apparatus orthogonally transforms and quantizes a prediction error 119 between the pixel block (input image 118) and the predicted image 127. The image encoding apparatus then carries out entropy encoding on the transformed and quantized prediction error to generate and output encoded data 130.

The image encoding apparatus in FIG. 1 carries out encoding by selective application of a plurality of prediction modes involving different block sizes and different methods for generating the predicted image 127. The method for generating the predicted image 127 is roughly classified into two types: intra-prediction which carries out prediction within the coding target frame and inter-prediction which carries out prediction using one or more reference frames temporally different from one another. In the present embodiment, orthogonal transformation and inverse orthogonal transformation carried out to generate a predicted image using intra-prediction will be described in detail.

Components of the image encoding apparatus in FIG. 1 will be described below.

The subtractor 101 subtracts the corresponding predicted image 127 from the coding target block in the input image 118 to obtain the prediction error 119. The subtractor 101 inputs the prediction error 119 to the orthogonal transformation unit 102.

The orthogonal transformation unit 102 orthogonally transforms the prediction error 119 from the subtractor 101 to obtain transform coefficients 120. The orthogonal transformation unit 102 will be described below in detail. The orthogonal transformation unit 102 inputs the transform coefficients 120 to the quantization unit 103.

The quantization unit 103 quantizes the transform coefficients from the orthogonal transformation unit 102 to obtain quantized transform coefficients 121. Specifically, the quantization unit 103 carries out quantization in accordance with quantization information such as a quantization parameter and a quantization matrix which is specified by the encoding control unit 116. The quantization parameter is indicative of the resolution of the quantization. The quantization matrix is used to weight the resolution of the quantization for each component of the transform coefficients. The quantization unit 103 inputs the quantized transform coefficients 121 to the coefficient order control unit 113 and the de-quantization unit 104.

The coefficient order control unit 113 transforms the quantized transform coefficients 121 which are a two-dimensional (2D) expression into a quantized transform coefficient sequence 117 which is a one-dimensional (1D) expression. The coefficient order control unit 113 then inputs the quantized transform coefficient sequence 117 to the entropy encoding unit 114. The coefficient control unit 113 will be described below in detail.

The entropy encoding unit 114 carries out entropy encoding (for example, Huffman encoding or arithmetic encoding) on various coding parameters such as the quantized transform coefficient sequence 117 from the coefficient control unit 113, the prediction information 126 from the prediction selection unit 110, and the quantization information which are specified by the encoding control unit 116. The coding parameters are required for decoding and include the prediction information 126, information on the transform coefficients, and information on the quantization. The coding parameters are held in an internal memory (not shown in the drawings) in the encoding control unit 116. When a prediction target block is encoded, the coding parameters for the already coded adjacent pixel block can be used. For example, H.264 intra-prediction enables a predicted value for the prediction mode of the prediction target block to be derived from the prediction mode information on the coded adjacent block.

The encoded data generated by the entropy encoding unit 114 is, for example, multiplexed and then temporarily accumulated in the output buffer 115. The data is then output as the encoded data 130 in accordance with an appropriate output timing managed by the encoding control unit 116. The encoded data 130 is output to, for example, an accumulation system (accumulation medium) or a transmission system (communication line) which is not shown in the drawings.

The de-quantization unit 104 de-quantizes the quantized transform coefficients 121 from the quantization unit 103 to obtain a restored transform coefficients 122. Specifically, the de-quantization unit 104 carries out de-quantization in accordance with the quantization information used in the quantization unit 103. The quantization information used in the quantization unit 103 is loaded from the internal memory in the encoding control unit 116. The de-quantization unit 104 inputs the restored transform coefficients 122 to the inverse orthogonal transformation unit 105.

The inverse orthogonal transformation unit 105 carries out an inverse orthogonal transformation corresponding to the orthogonal transformation performed by the orthogonal transformation unit 102 on the restored transform coefficients 122 from the de-quantization unit 104 to obtain a restored prediction error 123. The inverse orthogonal transformation unit 105 will be described below in detail. The inverse orthogonal transformation unit 105 inputs the restored prediction error 123 to the addition unit 106.

The addition unit 106 adds the restored prediction error 123 and the corresponding predicted image 127 together to generate a local decoded image 124. The local decoded image 124 is saved to the reference image memory 107. The local decoded image 124 saved to the reference image memory 107 is referenced by the intra-prediction unit 108 and the inter-prediction unit 109 as a reference image 125 as necessary.

Figures 7B, 7C, 7D:
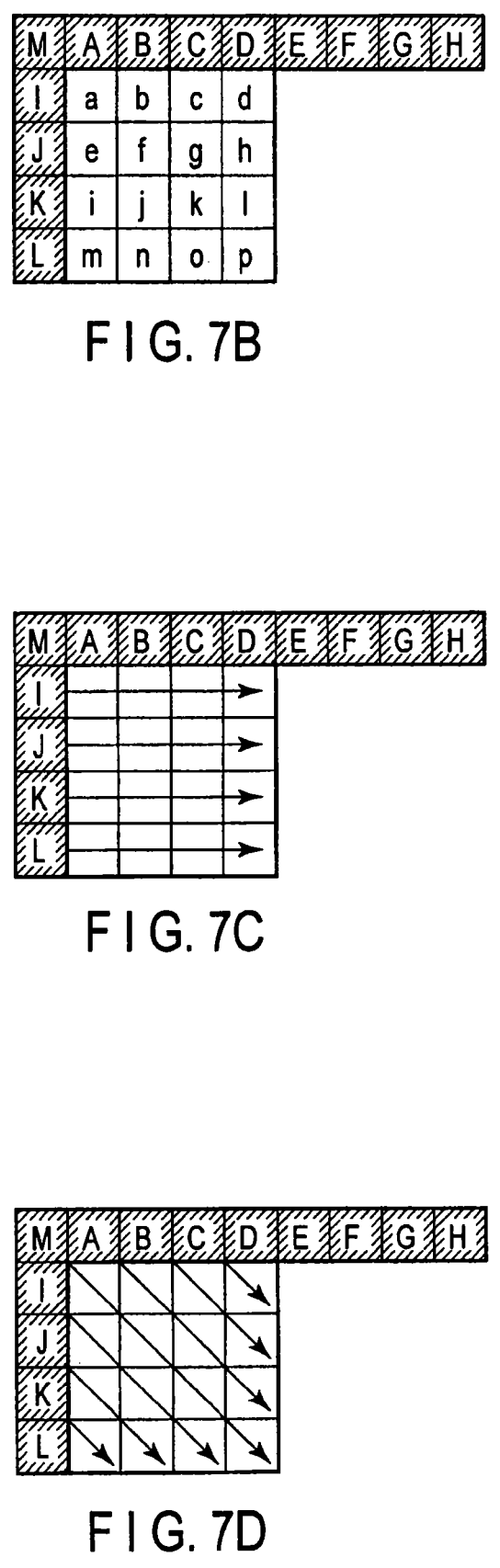

The intra-prediction unit 108 carries out intra-prediction utilizing the reference image 125 saved to the reference image memory 107. For example, H.264 utilizes the coded reference pixel value for the block adjacent to the prediction target bock to compensate for pixels (copy or interpolate pixels) along a prediction direction such as the vertical direction or the horizontal direction to generate an intra-predicted image. FIG. 7A shows prediction directions for the intra-prediction according to H.264. Furthermore, FIG. 7B shows the arrangement relation between reference pixels and coding target pixels according to H.264. FIG. 7C shows a method for generating a predicted image in a mode 1 (horizontal prediction). FIG. 7D shows a method for generating a predicted image in a mode 4 (diagonal down-right prediction; Intra_NxN_Diagonal_Down_Right in FIG. 4A).

The intra-prediction unit 108 may interpolate pixel values using a predetermined interpolation method and then copy the interpolated pixel values in a predetermined prediction direction. The prediction directions for the intra-prediction according to H. 264 are illustrated, but any number of prediction modes such as 17 or 33 types of prediction modes are made available by specifying a more detailed classification of prediction directions. For example, H.264 defines prediction angles at intervals of 22.5 degrees, but 17 types of prediction modes including DC prediction are made available by specifying prediction angles at intervals of 11.25 degrees. Furthermore, 33 types of prediction modes including DC prediction are made available by specifying prediction angles at intervals of 5.625 degrees. Alternatively, instead of being arranged at equal intervals, the angles of the prediction directions may each be expressed by a straight line which joins a first reference point to a second reference point obtained by moving the first reference point in the horizontal direction and in the vertical direction. As described above, the number of prediction modes can be easily increased, and the present embodiment is applicable regardless of the number of prediction modes.

The inter-prediction unit 109 carries out inter-prediction utilizing the reference image 125 saved to the reference image memory 107. Specifically, the inter-prediction unit 109 carries out a block matching process between the prediction target block and the reference image 125 to derive the amount of deviation in motion (motion vector). The inter-prediction unit 109 carries out an interpolation process (motion compensation) based on the motion vector to generate an inter-predicted image. H.264 enables the interpolation process to be achieved to an accuracy of a ¼ pixel. The derived motion vector is subjected to entropy encoding as a part of the prediction information 126.

The selection switch 111 selects an output end of the intra-prediction unit 108 or an output end of the inter-prediction unit 109 in accordance with the prediction information 126 from the prediction selection unit 110. The selection switch 111 then inputs an intra-predicted image or an inter-predicted image to the subtraction unit 101 and the addition unit 106 as the predicted image 127. If the prediction information 126 is indicative of intra-prediction, the selection switch 110 acquires the intra-predicted image from the intra-prediction unit 108 as a predicted image 127. On the other hand, if the prediction information 126 is indicative of inter-prediction, the selection switch 110 acquires the inter-predicted image from the inter-prediction unit 109 as a predicted image 127.

The prediction selection unit 110 has a function to set the prediction information 126 in accordance with the prediction mode controlled by the encoding control unit 116. As described above, the intra-prediction or the inter-prediction can be selected for generation of the predicted image 127. Moreover, a plurality of modes can further be selected for each of the intra-prediction or the inter-prediction. The encoding control unit 116 determines one of the plurality of prediction modes for the intra-prediction and the inter-prediction to be the optimum prediction mode. The prediction selection unit 110 sets the prediction information 126 according to the determined optimum prediction mode.

For example, in connection with the intra-prediction, the prediction mode information from the encoding control unit 116 is specified in the intra-prediction unit 108. In accordance with the prediction mode information, the intra-prediction unit 108 generates the predicted image 127. The encoding control unit 116 may specify a plurality of pieces of prediction mode information in order of increasing number of the prediction mode or decreasing number of the prediction mode. Furthermore, the encoding control unit 116 may limit the prediction mode in accordance with the characteristics of the input image. The encoding control unit 116 need not specify all the prediction modes but may specify at least one piece of prediction mode information for the coding target block.

For example, the encoding control unit 116 determines the optimum prediction mode using a cost function shown in:

$$K = SAD + \lambda \times OH \tag{1}$$

In Expression (1), OH denotes the amount of code for the prediction information 126 (for example, motion vector information and prediction block size information), and SAD denotes the sum of absolute difference between the prediction target block and the predicted image 127 (that is, the accumulated sum of the absolute values of the prediction error 119). Furthermore, λ denotes a Lagrange multiplier determined based on the value of the quantization information (quantization parameter), and K denotes a coding cost. If Expression (1) is used, the prediction mode which minimizes the coding cost K is determined to be optimum in terms of the amount of generated code and prediction errors. As a modification of Expression (1), the coding cost may be evaluated only from the OH or the SAD or by utilizing a value obtained by carrying out an Hadamard transformation on the SAD or a value approximate thereto.

Furthermore, the optimum prediction mode can be determined using a provisionally encoding unit (not shown in the drawings). For example, the encoding control unit 116 determines the optimum prediction mode using a cost function shown in:

$$J = D + \lambda \times R \tag{2}$$

In Expression (2), D denotes the sum of square differences (that is, coding distortion) between the prediction target block and a local decoded image, R denotes the amount of code estimated by provisionally encoding the predicted error between the prediction target block and the predicted image 127 for the prediction mode, and J denotes the coding cost. To derive the coding cost in Expression (2), a provisionally encoding process and a local decoding process need to be carried out in each prediction mode. This increases the scale of relevant circuits or the amount of calculation. On the other hand, the coding cost J is derived based on a more accurate coding distortion and a more accurate amount of code. Therefore, the optimum prediction mode is accurately determined to allow a high coding efficiency to be easily maintained. As a modification of Expression (2), the coding cost may be evaluated only from the R or the D or by utilizing a value approximate to the R or the D. Furthermore, the encoding control unit 116 may, in advance, narrow down the number of candidates for the prediction mode one of which is determined using Expression (1) or Expression (2), based on information pre-obtained for the prediction target block (prediction modes for the surrounding pixel blocks, the results of image analysis, and the like).

The encoding control unit 116 controls the components of the image encoding apparatus in FIG. 1. Specifically, the encoding control unit 116 performs various control operations for an encoding process including the above-described operations.

The 1D transform matrix set unit 112 generates 1D transform matrix set information 129 based on the prediction mode information included in the prediction information 126 from the prediction selection unit 110. The 1D transform matrix set unit 112 then inputs the 1D transform matrix set information 129 to the orthogonal transformation unit 102 and the inverse orthogonal transformation unit 105. The 1D transform matrix set information 129 will be described below in detail.

The orthogonal transformation unit 102 according to the present embodiment will be described below in detail with reference to FIG. 2.

The orthogonal transformation unit 102 includes a selection switch 201, a vertical transformation unit 202, a transposition unit 203, a selection switch 204, and a horizontal transformation unit 205. The vertical transformation unit 202 includes a 1D orthogonal transformation unit A 206 and a 1D orthogonal transformation unit B 207. The horizontal transformation unit 205 includes a 1D orthogonal transformation unit A 208 and a 1D orthogonal transformation unit B 209. The order of the vertical transformation unit 202 and the horizontal transformation unit 205 is illustrative and may be reversed.

The 1D orthogonal transformation unit A 206 and the 1D orthogonal transformation unit A 208 have common functions in that both units multiply an input matrix by a 1D transform matrix A. The 1D orthogonal transformation unit B 207 and the 1D orthogonal transformation unit B 209 have common functions in that both units multiply the input matrix by a 1D transform matrix B. Thus, the 1D orthogonal transformation unit A 206 and the 1D orthogonal transformation unit A 208 can also be implemented by using physically the same hardware in a time division manner.

This also applies to the 1D orthogonal transformation unit B 207 and the 1D orthogonal transformation unit B 209.

The selection switch 201 leads the prediction error 119 to one of the 1D orthogonal transformation unit A 206 and the 1D orthogonal transformation unit B 207 in accordance with a vertical transform index included in the 1D transform matrix set information 129. The 1D orthogonal transformation unit A 206 multiplies the input prediction error (matrix) 119 by a 1D transform matrix A and outputs the product. The 1D orthogonal transformation unit B 207 multiplies the input prediction error 119 by a 1D transform matrix B and outputs the product. Specifically, the 1D orthogonal transformation unit A 206 and the 1D orthogonal transformation unit B 207 (that is, the vertical transformation unit 202) carries out a one-dimensional orthogonal transformation shown in Expression (3) to eliminate a vertical correlation in the prediction error 119.

$$Y=VX \quad (3)$$

In Expression (3), X denotes a matrix (N×N) of the prediction error 119, V comprehensively denotes the 1D transform matrix A and the 1D transform matrix B (both are N×N matrices), and Y denotes an output matrix (N×N) from each of the 1D orthogonal transformation unit A 206 and the 1D orthogonal transformation unit B 207. Specifically, the transform matrix V is an N×N transform matrix in which a transform basis designed to eliminate the vertical correlation in the matrix X is vertically as row vectors. However, as described below, the 1D transform matrix A and the 1D transform matrix B are designed in different manners and have different types of nature. The 1D transform matrix A and the 1D transform matrix B may use integers obtained by the designed transform basis subjected to scalar multiplication.

Here, if the prediction error 119 is a rectangular block expressed as M×N, the size of the block to be orthogonally transformed may also be M×N.

The transposition unit 203 transposes the output matrix (Y) from the vertical transformation unit 202 and provides the transposed output matrix (Y) to the selection switch 204. However, the transposition unit 203 is illustrative, and the corresponding hardware need not necessarily be prepared. For example, the output matrix (Y) can be transposed without the need to prepare the hardware corresponding to the transposition unit 203 by saving the results of a 1D orthogonal transformation carried out by the vertical transformation unit 202 (each of the elements of the output matrix from the vertical transformation unit 202) and loading the results in an appropriate order when the horizontal transformation unit 205 performs a 1D orthogonal transformation.

The selection switch 204 leads the input matrix from the transposition unit 203 to one of the 1D orthogonal transformation unit A 208 and the 1D orthogonal transformation unit B 209 in accordance with a horizontal transform index included in the 1D transform matrix set information 129. The 1D orthogonal transformation unit A 208 multiplies the input matrix by the 1D transform matrix A and outputs the product. The 1D orthogonal transformation unit B 209 multiplies the input matrix by the 1D transform matrix B and outputs the product. Specifically, the 1D orthogonal transformation unit A 208 and the 1D orthogonal transformation unit B 209 (that is, the horizontal transformation unit 205) carries out a one-dimensional orthogonal transformation shown in Expression (4) to eliminate a horizontal correlation in the prediction error.

$$Z=HY^T \quad (4)$$

In Expression (4), H comprehensively denotes the 1D transform matrix A and the 1D transform matrix B (both are N×N matrices), and Z denotes an output matrix (N×N) from each of the 1D orthogonal transformation unit A 208 and the 1D orthogonal transformation unit B 209; the output matrix is indicative of the transform coefficients 120. Specifically, the transform matrix H is an N×N transform matrix in which a transform basis designed to eliminate the horizontal correlation in the matrix Y is vertically arranged as row vectors. As described above, the 1D transform matrix A and the 1D transform matrix B are designed in different manners and have different types of nature. Furthermore, the 1D transform matrix A and the 1D transform matrix B may use integers obtained by the designed transform basis subjected to scalar multiplication.

As described above, the orthogonal transformation unit 102 carries out an orthogonal transformation in accordance with the 1D transform matrix set information 129 input from the 1D transform matrix set unit 112, on the prediction error (matrix) 119 to generate the transform coefficients (matrix) 120. With H.264 taken into account, the orthogonal transformation unit 102 may include a DCT unit (not shown in the drawings) or one of the 1D transform matrix A and the 1D transform matrix B may be replaced with a matrix for DCT. For example, the 1D transform matrix B may be a transform matrix for DCT. Moreover, the orthogonal transformation unit 102 may implement, in addition to DCT, various orthogonal transformations such as a Hadamard transformation, Karhunen Loeve transformation described below, and discrete sine transformation.

Now, the difference in nature between the 1D transform matrix A and the 1D transform matrix B will be described. Some intra-prediction modes supported by H.264 and the like generate a predicted image by copying, along a prediction direction, a group of reference pixels on one or both of adjacent lines located to the left of and above the prediction target block or carrying out similar copying after interpolation. That is, this intra-prediction mode selects at least one reference pixel from the group of reference pixels in accordance with the prediction direction and copies the reference pixel or carries out interpolation using the reference pixels, to generate a predicted image. The intra-prediction mode utilizes the spatial correlation in an image and thus has a prediction accuracy which tends to decrease with increasing distance from the reference pixel. That is, the absolute value of the prediction error is likely to increase consistently with the distance from the reference pixel. The tendency is similarly exhibited regardless of the prediction direction. More specifically, in connection with the intra-prediction modes (for example, the mode 1 and mode 8 in FIG. 7A) in which only the group of reference pixels on the line located to the left of and adjacent to the prediction target block is referenced (the pixel values of the reference pixels are copied or interpolation is carried out using the reference pixels), the prediction error exhibits the tendency in the horizontal direction. In connection with the prediction modes in which only the group of reference pixels on the line located above and adjacent to the prediction target block is referenced (for example, the mode 0, mode 3, and mode 7 in FIG. 7A), the prediction error exhibits the tendency in the vertical direction. Moreover, in connection with the prediction modes (for example, the mode 4, mode 5, and mode 6 in FIG. 7A) in which the groups of reference pixels on the line located to the left of and adjacent to the prediction target block and on the line located above and adjacent to the prediction target block are referenced, the prediction error exhibits such a tendency in the horizontal direction and vertical direction. In general, the tendency is exhibited in the direction orthogonal to the line of the group of reference pixels utilized to generate a predicted image.

The 1D transform matrix A is generated by pre-designing a common transform basis so as to increase, compared to the 1D transform matrix B, a coefficient density after 1D orthogonal transformation (that is, to reduce the rate of nonzero coefficients in the quantized transform coefficients 121) in the orthogonal direction (vertical direction or horizontal direction). On the other hand, the 1D transform matrix B is generated by designing a general-purpose transform matrix having no such nature. For example, the general-purpose transformation is DCT. The efficiency of transformation of the prediction error in the intra-prediction and thus the coding efficiency are improved by carrying out a 1D orthogonal transformation in the orthogonal direction using the 1D transform matrix A. For example, the prediction error 119 in the mode 0 (vertical prediction) exhibits the tendency in the vertical direction but not in the horizontal direction. Hence, efficient orthogonal transformation can be achieved by carrying out a 1D orthogonal transformation in the vertical transformation unit 202 using the 1D transform matrix A and carrying out a 1D orthogonal transformation in the horizontal transformation unit 205 using the 1D transform matrix B.

The inverse orthogonal transformation unit 105 according to the present embodiment will be described below in detail with reference to FIG. 3.

The inverse orthogonal transformation unit 105 includes a selection switch 301, a vertical inverse transformation unit 302, a transposition unit 303, a selection switch 304, and a horizontal inverse transformation unit 305. The vertical inverse transformation unit 302 includes a 1D inverse orthogonal transformation unit A 306 and a 1D inverse orthogonal transformation unit B 307. The horizontal inverse transformation unit 305 includes a 1D inverse orthogonal transformation unit A 308 and a 1D inverse orthogonal transformation unit B 309. The order of the vertical inverse transformation unit 302 and the horizontal inverse transformation unit 305 is illustrative and may be reversed.

The 1D inverse orthogonal transformation unit A 306 and the 1D inverse orthogonal transformation unit A 308 have common functions in that both units multiply an input matrix by a transposed matrix of the 1D transform matrix A. The 1D inverse orthogonal transformation unit B 307 and the 1D inverse orthogonal transformation unit B 309 have common functions in that both units multiply an input matrix by a transposed matrix of the 1D transform matrix B. Thus, the 1D inverse orthogonal transformation unit A 306 and the 1D inverse orthogonal transformation unit A 308 can also be implemented by using physically the same hardware in a time division manner. This also applies to the 1D inverse orthogonal transformation unit B 307 and the 1D inverse orthogonal transformation unit B 309.

The selection switch 301 leads the restored transform coefficients 122 to one of the 1D inverse orthogonal transformation unit A 306 and the 1D inverse orthogonal transformation unit B 307 in accordance with the vertical transform index included in the 1D transform matrix set information 129. The 1D inverse orthogonal transformation unit A 306 multiplies the input restored transform coefficients 122 (matrix form) by a transposed matrix of the 1D transform matrix A and outputs the product. The 1D inverse orthogonal transformation unit B 307 multiplies the input restored transform coefficients 122 by a transposed matrix of the 1D transform matrix B and outputs the product. Specifically, the 1D inverse orthogonal transformation unit A 306 and the 1D inverse orthogonal transformation unit B 307 (that is, the vertical inverse transformation unit 302) carry out a one-dimensional inverse orthogonal transformation shown in:

$$Y' = V^T Z' \qquad (5)$$

In Expression (5), Z' denotes a matrix (N×N) of the restored transform coefficients 122, $V^T$ comprehensively denotes the transposed matrices of the 1D transform matrix A and the 1D transform matrix B (both are N×N matrices), and Y' denotes an output matrix (N×N) from each of the 1D inverse orthogonal transformation unit A 306 and the 1D inverse orthogonal transformation unit B 307.

The transposition unit 303 transposes the output matrix (Y') from the vertical inverse transformation unit 302 and outputs the transposed output matrix to the selection switch 304. However, the transposition unit 303 is illustrative, and the corresponding hardware need not necessarily be prepared. For example, the output matrix (Y') can be transposed without the need to prepare the hardware corresponding to the transposition unit 303 by saving the results of a 1D inverse orthogonal transformation carried out by the vertical transformation unit 302 (each of the elements of the output matrix from the vertical inverse transformation unit 302) and loading the results in an appropriate order when the horizontal inverse transformation unit 305 performs a 1D inverse orthogonal transformation.

The selection switch 304 leads the input matrix from the transposition unit 303 to one of the 1D inverse orthogonal transformation unit A 308 and the 1D inverse orthogonal transformation unit B 309 in accordance with a horizontal transform index included in the 1D transform matrix set information 129. The 1D inverse orthogonal transformation unit A 308 multiplies the input matrix by the transposed matrix of the 1D transform matrix A and outputs the product. The 1D inverse orthogonal transformation unit B 309 multiplies the input matrix by the transposed matrix of the 1D transform matrix B and outputs the product. Specifically, the 1D inverse orthogonal transformation unit A 308 and the 1D inverse orthogonal transformation unit B 309 (that is, the horizontal inverse transformation unit 305) carry out a one-dimensional inverse orthogonal transformation shown in:

$$X' = H^T Y'^T \qquad (6)$$

In Expression (6), HT comprehensively denotes the transposed matrices of the 1D transform matrix A and the 1D transform matrix B (both are N×N matrices), and X' denotes an output matrix (N×N) from each of the 1D inverse orthogonal transformation unit A 308 and the 1D inverse orthogonal transformation unit B 309; the output matrix is indicative of the restored prediction error 123.

As described above, the inverse orthogonal transformation unit 105 carries out an orthogonal transformation in accordance with the 1D transform matrix set information 129 input from the 1D transform matrix set unit 112, on the restored transform coefficients (matrix) 122 to generate the restored prediction error (matrix) 123. With H. 264 taken into account, the inverse orthogonal transformation unit 105 may include an IDCT unit (not shown in the drawings) or one of the 1D transform matrix A and the 1D transform matrix B may be replaced with a matrix for DCT. For example, the 1D transform matrix B may be a transform matrix for DCT. Moreover, the inverse orthogonal transformation unit 105 may implement, in addition to IDCT, inverse orthogonal transformations corresponding to various orthogonal transformations such as an Hadamard transformation, Karhunen Loeve transformation described below, and discrete sine transformation for coordination with the orthogonal transformation unit 102.

The 1D transform matrix set information 129 according to the present embodiment which is generated by the 1D transform matrix set unit 112 will be described below in detail.

The 1D transform matrix set information 129 directly or indirectly indicates the vertical transform index for selection of a transform matrix for use in vertical orthogonal transformation and vertical inverse orthogonal transformation and the horizontal transform index for selection of a transform matrix for use in horizontal orthogonal transformation and horizontal inverse orthogonal transformation. For example, the 1D transform matrix set information 129 can be expressed by a transform index (TrasformIdx) shown in FIG. 4D. Reference to the table in FIG. 4D allows a vertical transform index (Vertical Transform Idx) and a horizontal transform index (Horizontal Transform Idx) to be derived from the transform index.

As shown in FIG. 4B, a vertical transform index of "0" allows selection of the 1D transform matrix A (1D_Transform Matrix_A) or the transposed matrix thereof for vertical orthogonal transformation or vertical inverse orthogonal transformation. On the other hand, a vertical transform index of "1" allows selection of the 1D transform matrix B (1D_Transform_Matrix_B) or the transposed matrix thereof for vertical orthogonal transformation or vertical inverse orthogonal transformation.

As shown in FIG. 4C, a horizontal transform index of "0" allows selection of the 1D transform matrix A (1D_Transform_Matrix_A) or the transposed matrix thereof for horizontal orthogonal transformation or horizontal inverse orthogonal transformation. On the other hand, a horizontal transform index of "1" allows selection of the 1D transform matrix B (1D_Transform_Matrix_B) or the transposed matrix thereof for horizontal orthogonal transformation or horizontal inverse orthogonal transformation.

Furthermore, FIG. 4A illustrates the index for each (intra-) prediction mode (IntraNxNPredModeIndex), the name thereof (Name of IntraNxNPredMode), and the corresponding vertical transform index and horizontal transform index. In FIG. 4A, "NxN" is indicative of the size of the prediction target block (N=4, 8, 16, or the like). The size of the prediction target block can be expanded to "MxN" (that is, rectangles other than squares).

FIG. 4E is obtained by integrating FIG. 4A and FIG. 4D together and shows the index for each prediction mode, the name of the index, and the corresponding transform index.

The 1D transform matrix set unit 112 detects the index of the prediction mode from the prediction mode information included in the prediction information 126. The 1D transform matrix set unit 112 then generates the corresponding 1D transform matrix set information 129. The tables shown in FIG. 4A, FIG. 4B, FIG. 4C, FIG. 4D, and FIG. 4E are illustrative. The 1D transform matrix set unit 112 may generate the 1D transform matrix set information 129 while avoiding the use of some or all of the tables.

For example, TransformIdx indicative of 0 means that the vertical transform index indicates 0 and that the horizontal transform index indicates 0. This means that the 1D transform matrix A is used for vertical orthogonal transformation and that the 1D transform matrix A is used for horizontal orthogonal transformation. These index values also mean that the transposed matrix of the 1D transform matrix A is used for vertical inverse orthogonal transformation and that the transposed matrix of the 1D transform matrix A is used for horizontal inverse orthogonal transformation.

TransformIdx indicative of 1 means that the vertical transform index indicates 0 and that the horizontal transform index indicates 1. This means that the 1D transform matrix A is used for vertical orthogonal transformation and that the 1D transform matrix B is used for horizontal orthogonal transformation. These index values also mean that the transposed matrix of the 1D transform matrix A is used for vertical inverse orthogonal transformation and that the transposed matrix of the 1D transform matrix B is used for horizontal inverse orthogonal transformation.

TransformIdx indicative of 2 means that the vertical transform index indicates 1 and that the horizontal transform index indicates 0. This means that the 1D transform matrix B is used for vertical orthogonal transformation and that the 1D transform matrix A is used for horizontal orthogonal transformation. These index values also mean that the transposed matrix of the 1D transform matrix B is used for vertical inverse orthogonal transformation and that the transposed matrix of the 1D transform matrix A is used for horizontal inverse orthogonal transformation.

TransformIdx indicative of 3 means that the vertical transform index indicates 1 and that the horizontal transform index indicates 1. This means that the 1D transform matrix B is used for vertical orthogonal transformation and that the 1D transform matrix B is used for horizontal orthogonal transformation. These index values also mean that the transposed matrix of the 1D transform matrix B is used for vertical inverse orthogonal transformation and that the transposed matrix of the 1D transform matrix B is used for horizontal inverse orthogonal transformation.

The table shown in FIG. 4A assigns the 1D transform matrix set information 129 taking the above-described tendency of each intra-prediction mode into account. That is, 0 is assigned to the vertical transform index for the prediction modes exhibiting the tendency in the vertical direction of the prediction error. 0 is assigned to the horizontal transform index for the prediction modes exhibiting the tendency in the horizontal direction. On the other hand, 1 is assigned to each of the directions not exhibiting the tendency. When the vertical and horizontal directions of the prediction modes are classified into two classes depending on whether or not the tendency is present and the 1D transform matrix A or the 1D transform matrix B is adaptively applied to each of the vertical and horizontal directions, a higher transform efficiency can be achieved than in a case where fixed orthogonal transformation such as DCT is uniformly applied to the prediction modes.

The coefficient order control unit 113 will be described below in detail.

The coefficient order control unit 113 transforms the quantized transform coefficients 121, which are a two-dimensional expression, into the quantized transform coefficient sequence 117 which is a one-dimensional expression by arranging the elements of the quantized transform coefficients 121 according to a predetermined order. By way of example, the coefficient order control unit 113 can carry out a common 2D-1D transformation regardless of the prediction mode. Specifically, the coefficient order control unit 113 can utilize a zigzag scan as is the case with H.264. The zigzag scan arranges the elements of the quantized transform coefficients 121 in such an order as shown in FIG. 8A and transforms the elements into such a quantized transform coefficient sequence 117 as shown in FIG. 8B. In FIG. 8A and FIG. 8B, (i, j) denotes the coordinates (position information) of each element in the quantized transform coefficients (matrix) 121. Furthermore, FIG. 8C shows a 2D-1D transformation utilizing the zigzag scan (in the case of a 4×4 pixel block). Specifically, FIG. 8C shows an index (idx) indicative of the order of coefficients (the order of scans) in the quantized transform coefficient sequence 117 subjected to the 2D-1D transformation utilizing the zigzag scan, and the corresponding elements (cij) of the quantized transform coefficients 121. In FIG. 8C, cij denotes the elements with the coordinates (i, j) in the quantized transform coefficients (matrix) 121.

In another example, the coefficient order control unit 113 can carry out individual 2D-1D transformations for the respective prediction modes. The coefficient order control unit 113 performing such an operation is illustrated in FIG. 5A. The coefficient order control unit 113 includes a selection switch 501 and individual 2D-1D transformation units 502, . . . , and 510 for the respective nine types of prediction modes. In accordance with the prediction mode information (for example, the indices of the prediction modes in FIG. 4A) included in the prediction information 126, the selection switch 501 leads the quantized transform coefficients 121 to the 2D-1D transformation unit corresponding to the prediction mode (one of the 2D-1D transformation units 502, . . . , 510). For example, a prediction mode index of 0 allows the selection switch 501 to lead the quantized transform coefficients 121 to the 2D-1D transformation unit 502. In FIG. 5A, the prediction modes and the 2D-1D transformation units are in a one-to-one correspondence. The quantized transform coefficients 121 are led to one 2D-1D transformation unit corresponding to the prediction mode. FIG. 9 illustrates the 2D-1D transformation carried out by each of the 2D-1D transformation units 502, . . . , 510 (in the case of a 4×4 pixel block). A specific design technique for the 2D-1D transformation for each prediction mode as shown in FIG. 9 will be described below. FIG. 9 shows the index (idx) indicative of the order of coefficients (the order of scans) in the quantized transform coefficient sequence 117 subjected to the 2D-1D transformation by the 2D-1D transformation unit corresponding to each prediction mode, and the corresponding elements (cij) of the quantized transform coefficients 121. In FIG. 9, cij denotes the elements with the coordinates (i, j) in the quantized transform coefficients (matrix) 121. Furthermore, in FIG. 9, each prediction mode is expressed by its name, and the correspondence between the names and the prediction mode index is as shown in FIG. 4A. Thus, the application of the individual 2D-1D transformations for the respective prediction modes, for example, allows the coefficients to be scanned in an order suitable for the tendency to generate nonzero coefficients in the quantized transform coefficients 121 for each prediction mode. This improves the coding efficiency.

For simplification, the example regarding the 4×4 pixel block is shown. However, for an 8×8 pixel block, a 16×16 pixel block, and the like, the individual 2D-1D transformations for the respective prediction modes can similarly be defined. Furthermore, if the pixel block is a rectangular block expressed as M×N, the size of the block to be subjected to 2D-1D transformation may also be M×N. In this case, for the rectangular block, such individual 2D-1D transformations as illustrated in FIG. 9 may be defined for the respective prediction modes.

In yet another example, the coefficient order control unit 113 may dynamically update the scan order for the 2D-1D transformation. The coefficient order control unit 113 performing such an operation is illustrated in FIG. 5B. The coefficient order control unit 113 includes the selection switch 501, the individual 2D-1D transformation units 502, . . . , and 510 for the respective nine types of prediction modes, an occurrence frequency count unit 511, and a coefficient order update unit 512. The selection switch 501 is as described with reference to FIG. 5A. The individual 2D-1D transformation units 502, . . . , and 510 for the respective nine types of prediction modes are different from the 2D-1D transformation units shown in FIG. 5A in that the scan order for the 2D-1D transformation units 502, . . . , and 510 is updated by the coefficient order update unit 512.

The occurrence frequency count unit 511 creates, for each prediction mode, a histogram of the number of occurrences of nonzero coefficients in each element of the quantized transform coefficient sequence 117. The occurrence frequency count unit 511 inputs the created histogram 513 to the coefficient order update unit 512.

The coefficient order update unit 512 updates the order of coefficients at a predetermined timing based on the histogram 513. The timing may be, for example, a timing when an encoding process carried out on a coding tree unit is finished or a timing when an encoding process carried out on one line in the coding tree unit is finished.

Specifically, the coefficient order update unit 512 references the histogram 513 to update the order of coefficients for a prediction mode with an element for which the counted number of occurrences of nonzero coefficients is equal to or larger than a threshold. For example, the coefficient order update unit 512 performs the updating for a prediction mode with an element for which the counted number of occurrences of nonzero coefficients is 16 or more. Setting a threshold for the number of occurrences allows the order of coefficients to be globally updated, thus avoiding convergence to a local optimum solution.

The coefficient order update unit 512 sorts, for the updating-target prediction mode, the elements in order of decreasing occurrence frequency of nonzero coefficients. The sorting can be achieved in accordance with an existing algorithm, for example, bubble sort or quick sort. The coefficient order update unit 512 inputs coefficient order update information 514 indicative of the sorted order of the elements to the 2D-1D transformation unit corresponding to the updating-target prediction mode.

Once the coefficient order update information 514 is input to the 2D-1D transformation unit, the 2D-1D transformation unit carries out a 2D-1D transformation in accordance with the updated scan order. If the scan order is dynamically updated, initial scan orders for the 2D-1D transformation units need to be set. For example, the zigzag scan or the scan order illustrated in FIG. 9 can be utilized as the initial scan order.

The dynamic updating of the scan order is expected to achieve a stably high coding efficiency even if the tendency to generate nonzero coefficients in the quantized transform coefficients 121 varies depending on the nature of the predicted image, the quantization information (quantization parameter), and the like. Specifically, the amount of code generated in run length coding in the entropy encoding unit 114 can be reduced.

For simplification, H.264 has been illustrated and the case of the nine types of prediction modes has been described. However, even if the number of types of the prediction mode is increased to 17, 33, or the like, the individual 2D-1D transformations for the respective prediction modes can be achieved by adding 2D-1D transformation units corresponding to the prediction modes resulting from the increase.

Processing carried out on the coding target block (coding tree unit) by the image encoding apparatus in FIG. 1 will be described below with reference to FIG. 10A and FIG. 10B.

Figure 10A:
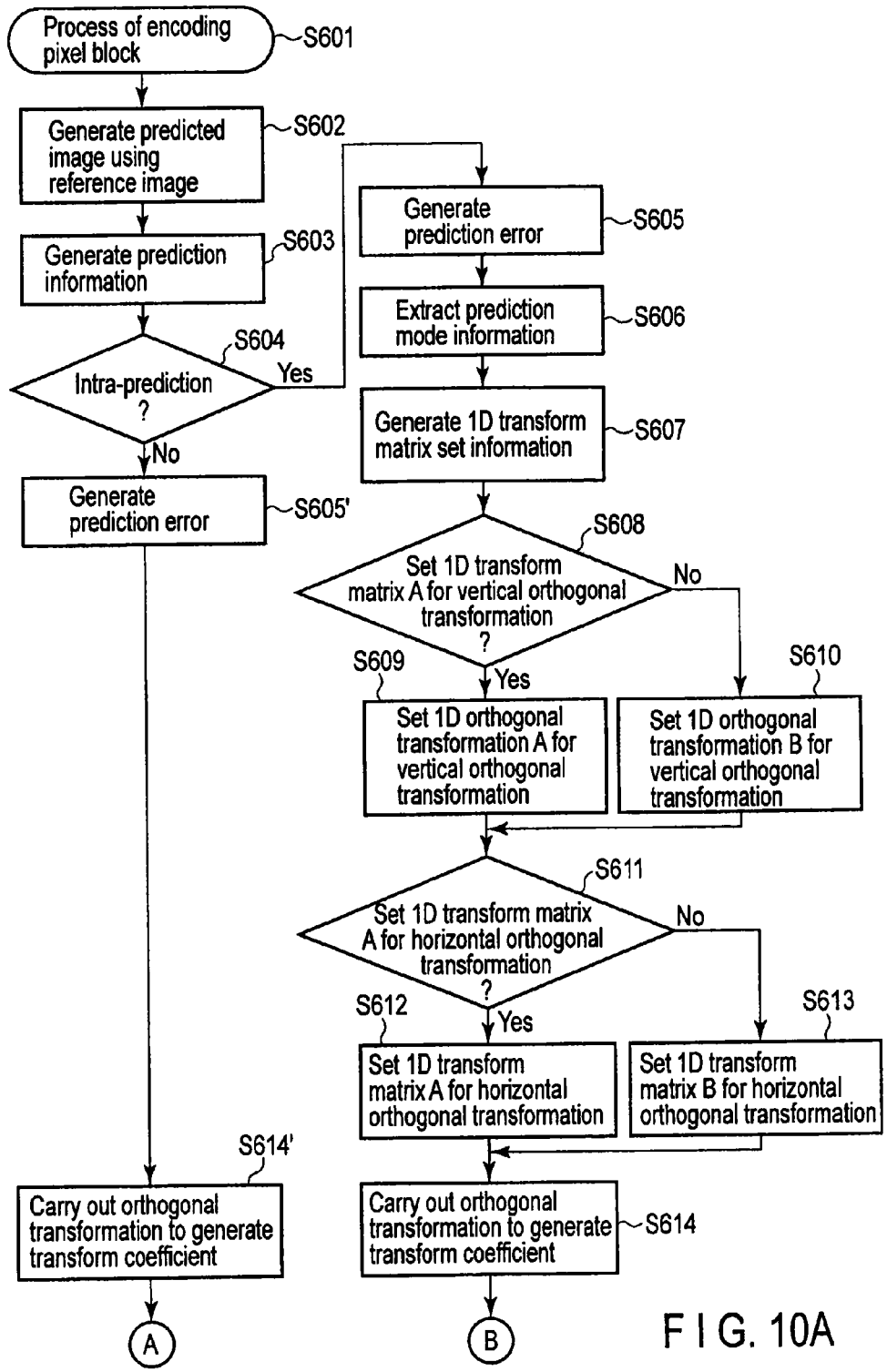
FIG. 10A is a flowchart illustrating processing carried out on a coding target block by the image encoding apparatus in FIG. 1.
Figure 10B:
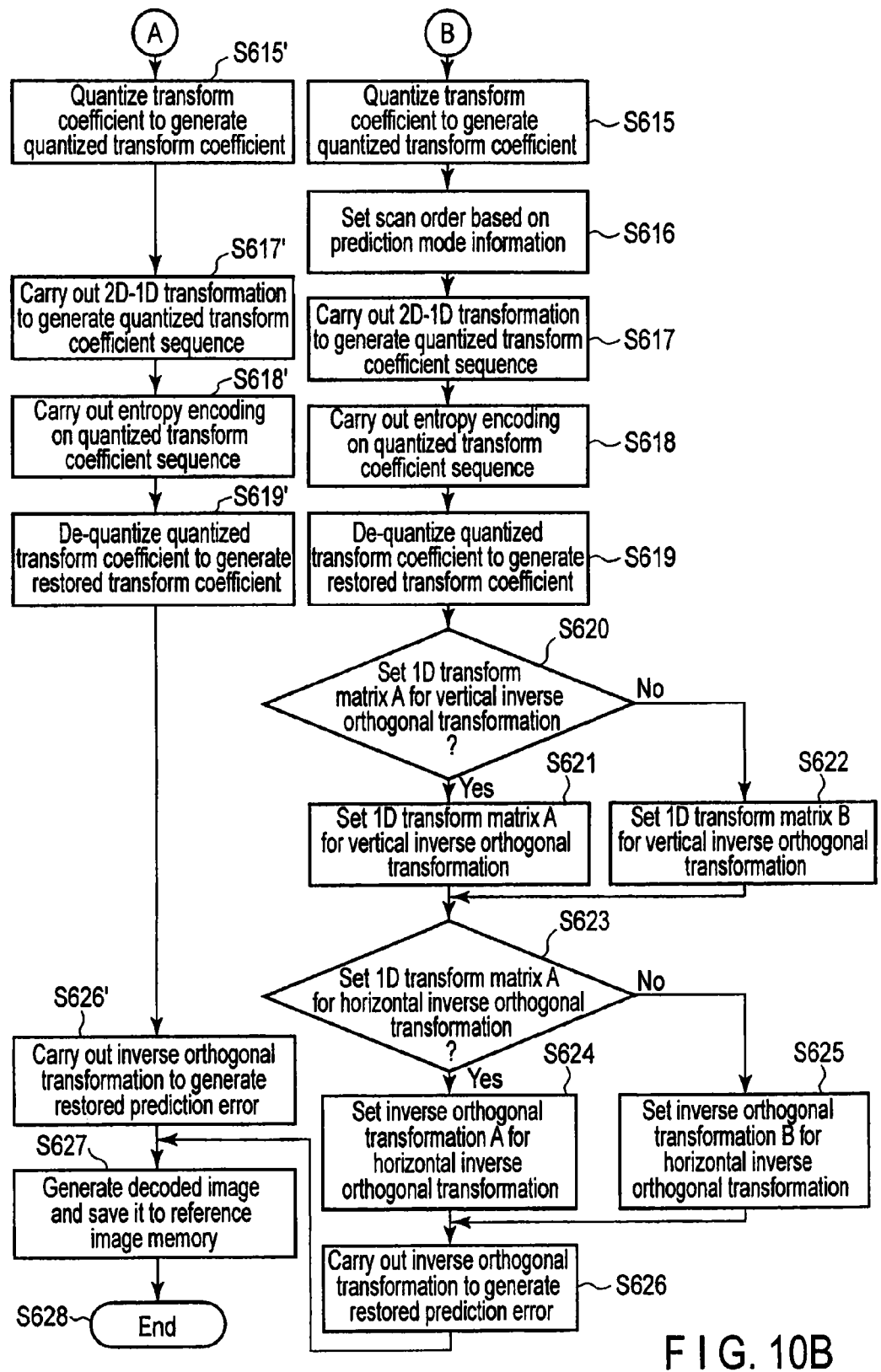
FIG. 10B is a flowchart illustrating the processing carried out on the coding target block by the image encoding apparatus in FIG. 1.

In the example shown in FIG. 10A and FIG. 10B, it is assumed that the orthogonal transformation and inverse orthogonal transformation according to the present embodiment (that is, the adaptive orthogonal transformation and inverse orthogonal transformation based on the 1D transform matrix set information 129) are enable. However, as described below, the syntax may be specified to make the orthogonal transformation and inverse orthogonal transformation according to the present embodiment disable.

Once the input image 118 is input to the image encoding apparatus in FIG. 1 in units of coding target block, a process of encoding the coding target block is started (step S601). The intra-prediction unit 108 and the inter-prediction unit 109 uses the reference image 125 saved to the reference image memory 107 to generate an intra-predicted image and an inter-predicted image (step S602). The encoding control unit 116 determines the optimum prediction mode in terms of the above-described coding cost to generate the prediction information 126 (step S603). The prediction information 126 is input to each element by the prediction selection unit 110 as described above. If the prediction information 126 generated in step S603 is indicative of intra-prediction, the processing proceeds to step S605. If the prediction information 126 generated in step S603 is indicative of inter-prediction, the processing proceeds to step S605'.

In step S605, the subtraction unit 101 subtracts the (intra-) predicted image 127 from the coding target block to generate the prediction error 119. The processing then proceeds to step S606. On the other hand, also in step S605', the subtraction unit 101 subtracts the (inter-) predicted image 127 from the coding target block to generate the prediction error 119. The processing then proceeds to step S614'.

In step S606, the 1D transform matrix set unit 112 extracts the prediction mode information included in the prediction information 126 generated in step S603. Based on the extracted prediction mode information (for example, with reference to the table in FIG. 4A), the 1D transform matrix set unit 112 generates the 1D transform matrix set information 129 (step S607). The 1D transform matrix set unit 112 inputs the 1D transform matrix set information 129 to the orthogonal transformation unit 102 and the inverse orthogonal transformation unit 105.

The selection switch 201 in the orthogonal transformation unit 102 selects the 1D orthogonal transformation unit A 206 or the 1D orthogonal transformation unit B 207 based on the 1D transform matrix set information 129 (step S608, step S609, and step S610). On the other hand, the selection switch 204 in the orthogonal transformation unit 102 selects the 1D orthogonal transformation unit A 208 or the 1D orthogonal transformation unit B 209 based on the 1D transform matrix set information 129 (step S611, step S612, and step S613). The processing then proceeds to step S614.

For example, if the transform index (TransformIdx), an example of the 1D transform matrix set information 129, is 0, the selection switch 201 selects the 1D orthogonal transformation unit A 206 in the vertical transformation unit 202 (step S609). If TransformIdx is 0, the selection switch 204 selects the 1D orthogonal transformation unit A 208 in the horizontal transformation unit 205 (step S612). If TransformIdx is 1, the selection switch 201 selects the 1D orthogonal transformation unit A 206 in the vertical transformation unit 202 (step S609). If TransformIdx is 1, the selection switch 204 selects the 1D orthogonal transformation unit B 209 in the horizontal transformation unit 205 (step S613). If TransformIdx is 2, the selection switch 201 selects the 1D orthogonal transformation unit B 207 in the vertical transformation unit 202 (step S610). If TransformIdx is 2, the selection switch 204 selects the 1D orthogonal transformation unit A 208 in the horizontal transformation unit 205 (step S612). If TransformIdx is 3, the selection switch 201 selects the 1D orthogonal transformation unit B 207 in the vertical transformation unit 202 (step S610). If TransformIdx is 3, the selection switch 204 selects the 1D orthogonal transformation unit B 209 in the horizontal transformation unit 205 (step S613).

In step S614, the orthogonal transformation unit 102 carries out a vertical transformation and a horizontal transformation which correspond to the settings made in step S608, . . . , and step S613, on the prediction error 119 to generate the transform coefficients 120. Subsequently, the quantization unit 103 quantizes the transform coefficients 120 generated in step S614 (step S615). The processing then proceeds to step S616.

On the other hand, in step S614', the orthogonal transformation unit 102 carries out fixed orthogonal transformation, for example, DCT, on the prediction error 119 to generate the transform coefficients 120. Subsequently, the quantization unit 103 quantizes the transform coefficients 120 generated in step S614' to generate the quantized transform coefficients 121 (step S615'). The processing proceeds to step S617'. The orthogonal transformation carried out in step S614' may be implemented by the DCT unit (not shown in the drawings) or by the 1D orthogonal transformation unit B 207 and the 1D orthogonal transformation unit B 209.

In step S616, the coefficient order control unit 113 sets the scan order (that is, in the example shown in FIG. 5A and FIG. 5B, the unit to which the selection switch 501 is connected) based on the prediction mode information included in the prediction information 126 generated in step S603. The processing proceeds to step S617. If the coefficient order control unit 113 carries out a common 2D-1D transformation regardless of the prediction mode, step S616 may be omitted.

In step S617, the coefficient order control unit 113 carries out a 2D-1D transformation corresponding to the setting made in step S616, on the quantized transform coefficients 121 to generate the quantized transform coefficient sequence 117. Subsequently, the entropy encoding unit 114 carries out entropy encoding on the coding parameters including the quantized transform coefficient sequence 117 (step S618). The encoded data 130 is output at the appropriate timing managed by the encoding control unit 116. On the other hand, the de-quantization unit 104 de-quantizes the quantized transform coefficients 121 to generate the restored transform coefficients 122 (step S619). The processing proceeds to step S620.

In step S617', the coefficient order control unit 113 carries out, for example, fixed 2D-1D transformation such as the zigzag scan or 2D-1D transformation corresponding to Intra_N×N_DC in FIG. 9, on the quantized transform coefficient sequence 121 to generate the quantized transform coefficient sequence 117. Subsequently, the entropy encoding unit 114 carries out entropy encoding on the coding parameters including the quantized transform coefficient sequence 117 (step S618'). The encoded data 130 is output at the appropriate timing managed by the encoding control unit 116. On the other hand, the de-quantization unit 104 de-quantizes the quantized transform coefficients 121 to generate the restored transform coefficients 122 (step S619'). The processing then proceeds to step S626'.

The selection switch 301 in the inverse orthogonal transformation unit 105 selects the 1D inverse orthogonal transformation unit A 306 or the 1D inverse orthogonal transformation unit B 307 based on the 1D transform matrix set information 129 (step S620, step S621, and step S622). On the other hand, the selection switch 304 in the inverse orthogonal transformation unit 105 selects the 1D inverse orthogonal transformation unit A 308 or the 1D inverse orthogonal transformation unit B 309 based on the 1D transform matrix set information 129 (step S623, step S624, and step S625). The processing then proceeds to step S626.

For example, if the transform index (TransformIdx), an example of the 1D transform matrix set information 129, is 0, the selection switch 301 selects the 1D inverse orthogonal transformation unit A 306 in the vertical inverse transformation unit 302 (step S621). If TransformIdx is 0, the selection switch 304 selects the 1D inverse orthogonal transformation unit A 308 in the horizontal inverse transformation unit 305 (step S624). If TransformIdx is 1, the selection switch 301 selects the 1D inverse orthogonal transformation unit A 306 in the vertical inverse transformation unit 302 (step S621). If TransformIdx is 1, the selection switch 304 selects the 1D inverse orthogonal transformation unit B 309 in the horizontal inverse transformation unit 305 (step S625). If TransformIdx is 2, the selection switch 301 selects the 1D inverse orthogonal transformation unit B 307 in the vertical inverse transformation unit 302 (step S622). If TransformIdx is 2, the selection switch 304 selects the 1D inverse orthogonal transformation unit A 308 in the horizontal inverse transformation unit 305 (step S624). If TransformIdx is 3, the selection switch 301 selects the 1D inverse orthogonal transformation unit B 307 in the vertical inverse transformation unit 302 (step S622). If TransformIdx is 3, the selection switch 304 selects the 1D inverse orthogonal transformation unit B 309 in the horizontal inverse transformation unit 305 (step S625).

In step S626, the inverse orthogonal transformation unit 105 carries out a vertical transformation and a horizontal transformation which correspond to the settings made in step S620, . . . , and step S625, on the restored transform coefficients 122 to generate the restored prediction error 123. The processing proceeds to step S627. In step S626', the inverse orthogonal transformation unit 105 carries out an inverse orthogonal transformation, for example, IDCT, on the restored transform coefficients 123 to generate the restored prediction error 123. The processing then proceeds to step S627. The fixed inverse orthogonal transformation carried out in step S626' may be implemented by the IDCT unit (not shown in the drawings) or by the 1D inverse orthogonal transformation unit B 307 and the 1D inverse orthogonal transformation unit B 309.

In step S627, the addition unit 106 adds the restored prediction error 123 generated in step S626 or step S626' to the predicted image 127 to generate the local decoded image 124. The local decoded image 124 is saved to the reference image memory 107 as a reference image. Thus, the process of encoding the coding target block ends (step S628).

A technique for designing the 1D transform matrix A and the 1D transform matrix B will be described below. According to H.264, nine types of prediction modes are defined for the 4×4 pixel block and the 8×8 pixel block. Four types of prediction modes are defined for the 16×16 pixel block.

First, the prediction error 119 for each prediction mode is generated. Those of the prediction errors 119 for the respective prediction modes are collected which exhibit, in the vertical direction or the horizontal direction, the above-described tendency to have an absolute value increasing with the distance from the reference pixel. Then, singular value decomposition is carried out on a matrix in which the direction with the tendency exhibited therein is defined as a column direction and in which the prediction errors 119 are arranged in a row direction. Thus, a 1D orthogonal basis is designed which eliminates the vertical correlation in the matrix. The 1D orthogonal basis is arranged in the column direction as row vectors to generate the 1D transform matrix A.

On the other hand, singular value decomposition is carried out on a matrix in which the direction with the tendency not exhibited therein is defined as the column direction and in which the prediction errors 119 are arranged in the row direction. Thus, a 1D orthogonal basis is generated which eliminates the vertical correlation in the matrix. The 1D orthogonal basis is arranged in the column direction as row vectors to generate the 1D transform matrix B. The 1D transform matrix B may simply be replaced with a matrix for DCT. For simplification, the design for the 4×4 pixel block has been illustrated. However, 1D transform matrices for the 8×8 pixel block and the 16×16 pixel block can similarly be designed. Furthermore, the above-described design technique is illustrative and the design may be carried out as appropriate with the above-described nature of a prediction error taken into account.

A specific design technique for the 2D-1D transformation for each prediction mode (scan order) as illustrated in FIG. 9 will be described below. The scan order for each prediction mode can be designed based on the quantized transform coefficients 121 generated by the quantization unit 103. For example, the design for the 4×4 pixel block prepares a plurality of training images to generate a prediction error 119 for each of the nine types of prediction modes. The orthogonal transformations shown in Expression (3) and Expression (4) are carried out on each of the prediction error 119 to generate the transform coefficients 120. Then the transform coefficients 120 are quantized. In connection with the quantized transform coefficients 121, the number of occurrences of nonzero coefficients is cumulatively added for each of the elements of the 4×4 pixel block. The cumulative addition is carried out on all the training images to create a histogram indicative of the occurrence frequency of nonzero coefficients for each of the 16 elements of the 4×4 pixel block. Based on the histogram, indices of 0 to 15 are assigned to the elements in order of decreasing occurrence frequency. Such assignment of the indices is individually carried out on all the prediction modes. The order of the assigned indices is used as the scan order corresponding to each prediction mode.

For simplification, the design for the 4×4 pixel block has been illustrated. However, the scan orders for the 8×8 pixel block and the 16×16 pixel block can similarly be designed. Furthermore, even if the number of prediction modes is increased to 17, 33, or any other value, the design can be achieved using a similar technique. The method for dynamically updating the scan order is as described with reference to FIG. 5B.

A syntax utilized by the image encoding apparatus in FIG. 1 will be described.

Figures 11, 12:
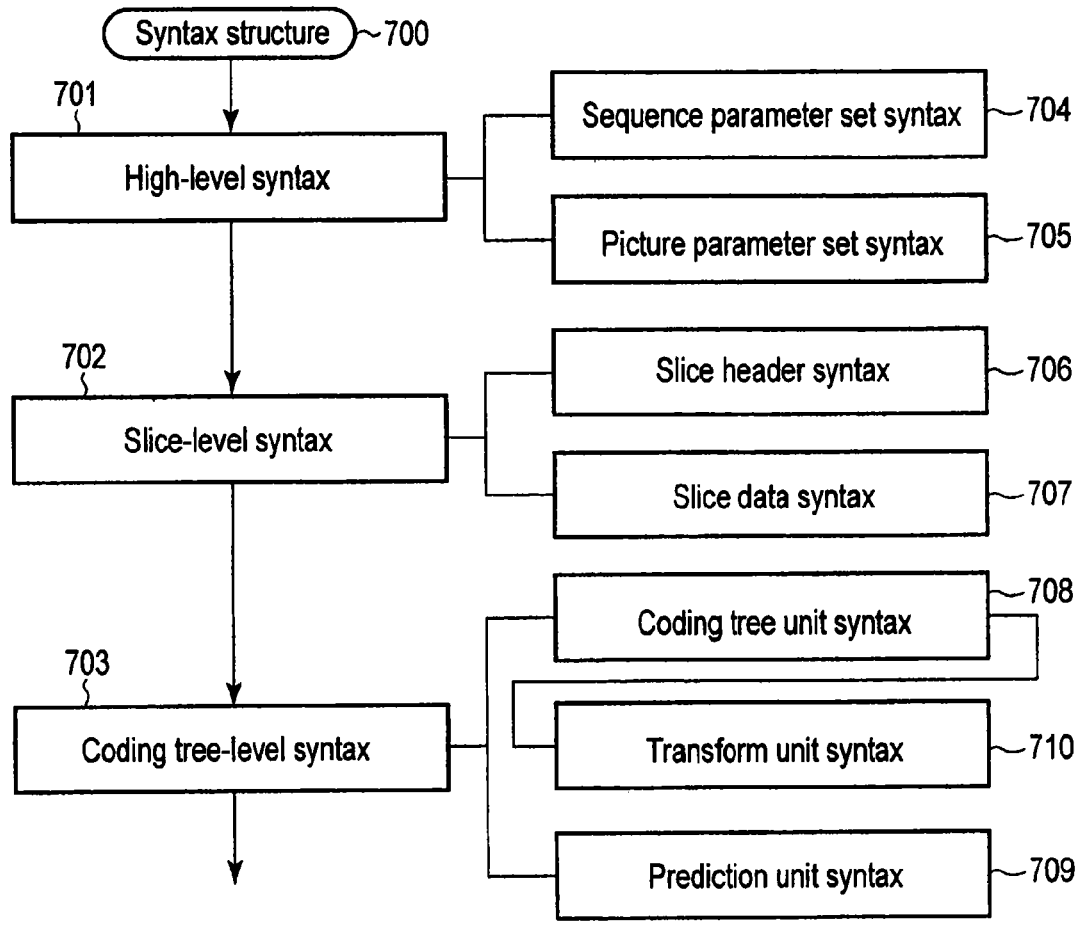
FIG. 11 is a diagram illustrating a syntax structure.
FIG. 12 is a diagram illustrating slice header syntax.

The syntax is indicative of the structure of encoded data (for example, the encoded data 130 in FIG. 1) obtained by the image encoding apparatus encoding video data. When the encoded data is decoded, the image decoding apparatus references the same syntax structure to interpret the syntax. FIG. 11 illustrates syntax 700 utilized by the image encoding apparatus in FIG. 1.

The syntax 700 includes three parts, that is, high-level syntax 701, slice-level syntax 702, and coding tree-level syntax 703. The high-level syntax 701 includes syntax information on a layer higher than a slice. The slice refers to a rectangular area or a continuous area included in a frame or a field. The slice-level syntax 702 includes information required to decode each slice. The coding tree-level syntax 703 includes information required to decode each coding tree (that is, each coding tree unit). Each of these parts includes a further detailed syntax.

The high-level syntax 701 includes sequence-level syntax and picture-level syntax such as sequence parameter set syntax 704 and picture parameter set syntax 705. The slice-level syntax 702 includes slice header syntax 706 and slice data syntax 707. The coding tree level syntax 703 includes coding tree unit syntax 708 and prediction unit syntax 709.

The coding tree unit syntax 708 may have a quadtree structure. Specifically, as a syntax element of the coding tree unit syntax 708, the coding tree unit syntax 708 can further be recursively invoked. That is, one coding tree unit can be divided into pieces using quadtrees. Furthermore, the coding tree unit syntax 708 contains transform unit syntax 710. The transform unit syntax 710 is invoked at each coding tree unit syntax 708 located at the terminal of the quadtree. The transform unit syntax 710 has information on inverse orthogonal transformation, quantization, and the like described therein.

FIG. 12 illustrates the slice header syntax 706 according to the present embodiment. slice_directional_unified_transform_flag shown in FIG. 12 is, for example, a syntax element which indicates whether the orthogonal transformation and inverse orthogonal transformation according to the present embodiment are enable or disable for a certain slice.

slice_directional_unified_transform_flag of 0 means that the orthogonal transformation and inverse orthogonal transformation according to the present embodiment are enable in the slice. Hence, the orthogonal transformation unit 102 and the inverse orthogonal transformation unit 105 carry out fixed orthogonal transformation and inverse orthogonal transformation such as DCT and IDCT. The fixed orthogonal transformation and inverse orthogonal transformation may be carried out by the 1D orthogonal transformation unit B 207, the 1D orthogonal transformation unit B 209, the 1D inverse orthogonal transformation unit B307, and the 1D inverse orthogonal transformation unit B309 (that is, by the 1D transform matrix B) or by the DCT unit and IDCT unit (neither of the units is shown in the drawings). Furthermore, the coefficient order control unit 113 carries out fixed 2D-1D transformation (for example, the zigzag scan). The fixed 2D-1D transformation may be carried out by the 2D-1D transformation unit (mode 2) 504 or by a 2D-1D transformation unit not shown in the drawings.

By way of example, slice_directional_unified_transform_flag of 1 means that the orthogonal transformation and inverse orthogonal transformation according to the present embodiment are enable throughout the slice. That is, the encoding process is carried out in accordance with the above-described flowchart of encoding in FIG. 10A and FIG. 10B. That is, the selection switch 201 selects the 1D orthogonal transformation unit A 206 or the 1D orthogonal transformation unit B 207 based on the 1D transform matrix set information 129. The selection switch 204 selects the 1D orthogonal transformation unit A 208 or the 1D orthogonal transformation unit B 209 based on the 1D transform matrix set information 129. Furthermore, the selection switch 301 selects the 1D inverse orthogonal transformation unit A 306 or the 1D inverse orthogonal transformation unit B 307 based on the 1D transform matrix set information 129. The selection switch 304 selects the 1D inverse orthogonal transformation unit A 308 or the 1D inverse orthogonal transformation unit B 309 based on the 1D transform matrix set information 129. Moreover, the selection switch 501 selects one of the 2D-1D transformation units 502, . . . , and 510 in accordance with the prediction mode information included in the prediction information 126.

Furthermore, in another example, if slice_directional_unified_transform_flag is 1, a syntax in a lower layer (such as the coding tree unit or the transform unit) may be specified to indicate whether the orthogonal transformation and inverse orthogonal transformation according to the present embodiment are enable or disable for each local area inside the slice.

FIG. 13 illustrates the coding tree unit syntax 708 according to the present embodiment. ctb_directional_unified_transform_flag shown in FIG. 13 is a syntax element indicating whether the orthogonal transformation and inverse orthogonal transformation according to the present embodiment are enable or disable for a certain coding unit. Furthermore, pred_mode shown in FIG. 13 is a syntax element included in the prediction unit syntax 709 and indicates the type of coding in the coding tree unit or a macro block. MODE_INTRA indicates that the coding type is intra-prediction. ctb_directional_unified_transform_flag is encoded only when the above-described slice_directional_unified_transform_flag is 1 and when the coding type of the coding tree unit is intra-prediction.

ctb_directional_unified_transform_flag of 0 means that the orthogonal transformation and inverse orthogonal transformation according to the present embodiment are disable in the coding tree unit. Hence, the orthogonal transformation unit 102 and the inverse orthogonal transformation unit 105 carry out fixed orthogonal transformation and inverse orthogonal transformation such as DCT and IDCT. The fixed orthogonal transformation and inverse orthogonal transformation may be carried out by the 1D orthogonal transformation unit B 207, the 1D orthogonal transformation unit B 209, the 1D inverse orthogonal transformation unit B 307, and the 1D inverse orthogonal transformation unit B 309 (that is, by the 1D transform matrix B) or by the DCT unit and IDCT unit (neither of the units is shown in the drawings). Furthermore, the coefficient order control unit 113 carries out fixed 2D-1D transformation (for example, the zigzag scan). The fixed 2D-1D transformation may be carried out by the 2D-1D transformation unit (mode 2) 504 or by the 2D-1D transformation unit not shown in the drawings.

On the other hand, ctb_directional_unified_transform_flag of 1 makes the orthogonal transformation and inverse orthogonal transformation according to the present embodiment enable in the coding unit. Then, the encoding process is carried out in accordance with the above-described flowchart of encoding in FIG. 10A and FIG. 10B. That is, the selection switch 201 selects the 1D orthogonal transformation unit A 206 or the 1D orthogonal transformation unit B 207 based on the 1D transform matrix set information 129. The selection switch 204 selects the 1D orthogonal transformation unit A 208 or the 1D orthogonal transformation unit B 209 based on the 1D transform matrix set information 129. Furthermore, the selection switch 301 selects the 1D inverse orthogonal transformation unit A 306 or the 1D inverse orthogonal transformation unit B 307 based on the 1D transform matrix set information 129. The selection switch 304 selects the 1D inverse orthogonal transformation unit A 308 or the 1D inverse orthogonal transformation unit B 309 based on the 1D transform matrix set information 129. Moreover, the selection switch 501 selects one of the 2D-1D transformation units 502, . . . , and 510 in accordance with the prediction mode information included in the prediction information 126.

When the flag specifying whether the orthogonal transformation and inverse orthogonal transformation according to the present embodiment are enable or disable is encoded in the coding tree unit syntax 708 as in the example in FIG. 13, the amount of information (the amount of code) is increased compared to when the flag is not encoded. However, encoding the flag enables the optimum orthogonal transformation to be carried out for each local area (that is, for each coding tree unit).

FIG. 14 illustrates the transform unit syntax 710 according to the present embodiment. tu_directional_unified_transform_flag shown in FIG. 14 is a syntax element indicating whether the orthogonal transformation and inverse orthogonal transformation according to the present embodiment are enable or disable for a certain transform unit. Furthermore, pred_mode shown in FIG. 14 is a syntax element included in the prediction unit syntax 709 and indicates the type of coding in a certain coding tree unit or macro block. MODE_INTRA indicates that the coding type is intra-prediction. tu_directional_unified_transform_flag is encoded only when the above-described slice_directional_unified_transform_flag is 1 and when the coding type of the coding tree unit is intra-prediction.

tu_directional_unified_transform_flag of 0 makes the orthogonal transformation and inverse orthogonal transformation according to the present embodiment disable in the transform unit. Hence, the orthogonal transformation unit 102 and the inverse orthogonal transformation unit 105 carry out fixed orthogonal transformation and inverse orthogonal transformation such as DCT and IDCT. The fixed orthogonal transformation and inverse orthogonal transformation may be carried out by the 1D orthogonal transformation unit B 207, the 1D orthogonal transformation unit B 209, the 1D inverse orthogonal transformation unit B 307, and the 1D inverse orthogonal transformation unit B 309 (that is, by the 1D transform matrix B) or by the DCT unit and IDCT unit (neither of the units is shown in the drawings). Furthermore, the coefficient order control unit 113 carries out fixed 2D-1D transformation (for example, the zigzag scan). The fixed 2D-1D transformation may be carried out by the 2D-1D transformation unit (mode 2) 504 or by the 2D-1D transformation unit not shown in the drawings.

On the other hand, tu_directional_unified_transform_flag of 1 makes the orthogonal transformation and inverse orthogonal transformation according to the present embodiment enable in the transform unit. Then, the encoding process is carried out in accordance with the above-described flowchart of encoding in FIG. 10A and FIG. 10B. That is, the selection switch 201 selects the 1D orthogonal transformation unit A 206 or the 1D orthogonal transformation unit B 207 based on the 1D transform matrix set information 129. The selection switch 204 selects the 1D orthogonal transformation unit A 208 or the 1D orthogonal transformation unit B 209 based on the 1D transform matrix set information 129. Furthermore, the selection switch 301 selects the 1D inverse orthogonal transformation unit A 306 or the 1D inverse orthogonal transformation unit B 307 based on the 1D transform matrix set information 129. The selection switch 304 selects the 1D inverse orthogonal transformation unit A 308 or the 1D inverse orthogonal transformation unit B 309 based on the 1D transform matrix set information 129. Moreover, the selection switch 501 selects one of the 2D-1D transformation units 502, . . . , and 510 in accordance with the prediction mode information included in the prediction information 126.

When the flag specifying whether the orthogonal transformation and inverse orthogonal transformation according to the present embodiment are enable or disable is encoded in the transform unit syntax 710 as in the example in FIG. 14, the amount of information (the amount of code) is increased compared to when the flag is not coded. However, encoding the flag enables the optimum orthogonal transformation to be carried out for each local area (that is, for each transform unit).

Syntax elements not specified according to the present embodiment or descriptions of other conditional branches may be inserted between rows in the syntax tables illustrated in FIG. 12, FIG. 13, and FIG. 14. Furthermore, the syntax table may be divided into a plurality of tables or a plurality of the syntax tables may be unified. Additionally, the illustrated terms for the syntax elements may be optionally changed.

As described above, the image encoding apparatus according to the present embodiment utilizes the tendency of the intra-prediction to have a prediction accuracy decreasing with increasing distance from the reference pixel. The image encoding apparatus classifies the vertical and horizontal directions of the prediction modes into two classes depending on whether or not the tendency is present. The image encoding apparatus further adaptively applies the 1D transform matrix A or the 1D transform matrix B to each of the vertical and horizontal directions. The 1D transform matrix A is generated by pre-designing a common transform basis so as to increase the coefficient density after 1D orthogonal transformation (that is, to reduce the rate of nonzero coefficients in the quantized transform coefficients 121) in a direction orthogonal to the line of the group of reference pixels (vertical direction or horizontal direction). On the other hand, the 1D transform matrix B is generated by designing a general-purpose transform matrix having no such nature. For example, the general-purpose transformation is DCT. Hence, the image encoding apparatus according to the present embodiment achieves a high transform efficiency compared to the case where a fixed orthogonal transformation such as DCT is uniformly applied to the prediction modes.

Furthermore, the orthogonal transformation unit 102 and inverse orthogonal transformation unit 105 according to the present embodiment are suited both for hardware implementation and for software implementation.

Expression (3) to Expression (6) express multiplications of fixed matrices. Thus, when the orthogonal transformation unit and the inverse orthogonal transformation unit are implemented by hardware, the implementation is expected to be configured using hard wired logic instead of multipliers.

Figure 15:
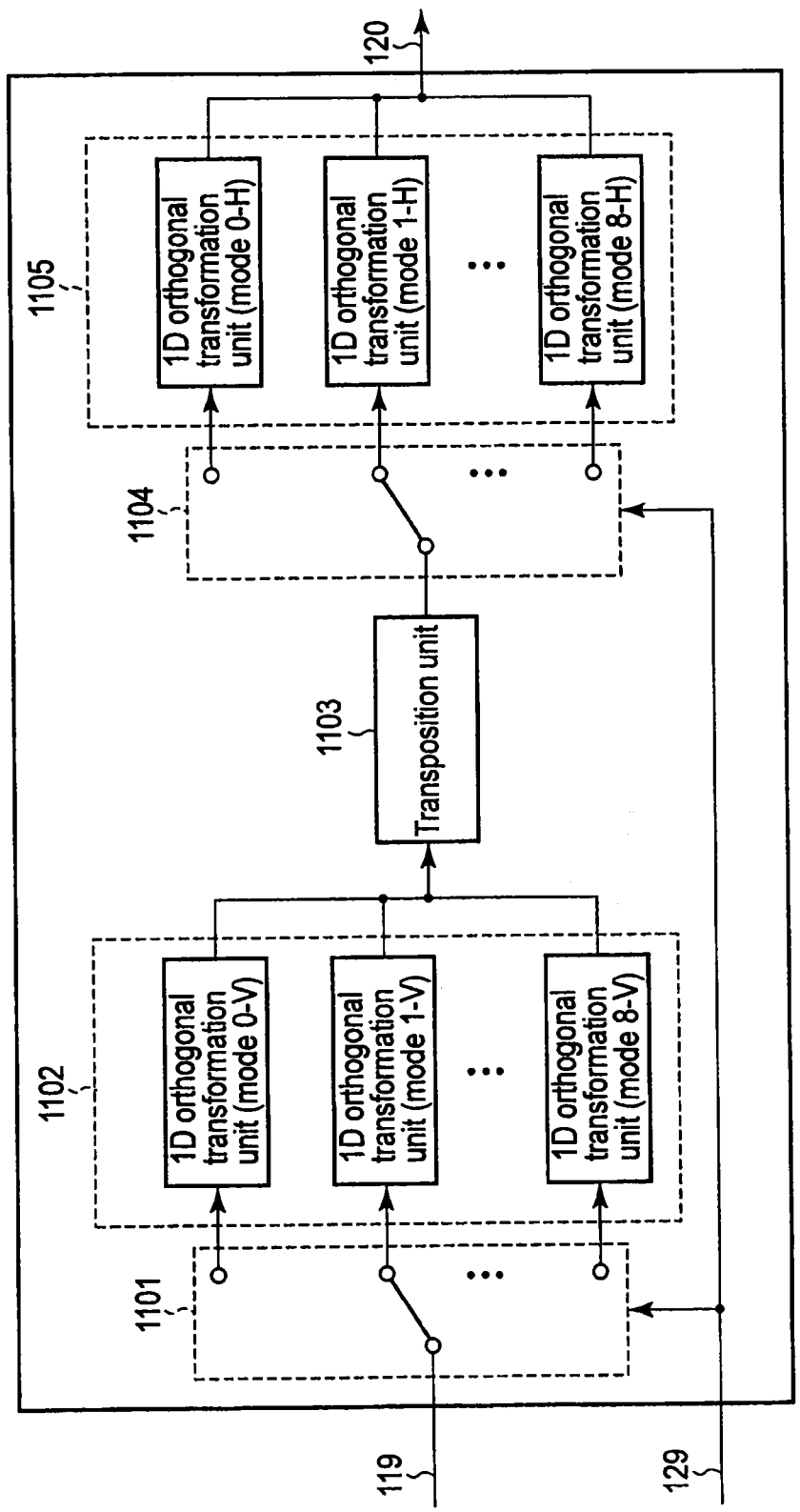
FIG. 15 is a block diagram illustrating an orthogonal transformation unit which carries out orthogonal transformation on each of nine types of prediction directions using a particular transform basis.

If a dedicated transform basis is used for each of the nine types of intra-prediction modes to carry out orthogonal transformation and inverse orthogonal transformation, nine 2D orthogonal transformation units need to be prepared or 18 (=9×2) 1D orthogonal transformation units need to be prepared as shown in FIG. 15. The nine 2D orthogonal transformation units or 18 1D orthogonal transformation units carry out multiplications of different transform matrices. As a result, besides dedicated hardware for DCT required for H.264, the nine 2D orthogonal transformation units or 18 1D orthogonal transformation units are additionally provided. This increases the scale of relevant circuits.

On the other hand, as shown in FIG. 2 and FIG. 3, the orthogonal transformation unit and inverse orthogonal transformation unit according to the present embodiment use a combination of two (if a vertical (inverse) transformation unit and a horizontal (inverse) transformation unit are shared in a time division manner) 1D orthogonal transformation units with a circuit for matrix transposition to carry out four types of two-dimensional orthogonal transformations. Hence, the orthogonal transformation unit and inverse orthogonal transformation unit according to the present embodiment allow an increase in the circuit scale in the hardware implementation to be significantly suppressed.

Furthermore, if a dedicated transform basis is used for each of the nine types of intra-prediction modes to carry out orthogonal transformation and inverse orthogonal transformation, the software implementation is expected to be as follows. Nine 2D orthogonal transform matrices or 18 (=9×2) 1D orthogonal transform matrices are saved in a memory. Each of the transform matrices is invoked for the corresponding one of the prediction modes, and an orthogonal transformation is implemented using a general-purpose multiplier. This may increase the size of the memory to which the transform matrices are saved and thus the costs and also increase memory bandwidth as a result of loading of a transform matrix into the memory for each transformation.

On the other hand, the orthogonal transformation unit and inverse orthogonal transformation unit according to the present embodiment combines vertical transformation and horizontal transformation using two 1D orthogonal transform matrices, to carry out four types of orthogonal transformations. Thus, the orthogonal transformation unit and inverse orthogonal transformation unit according to the present embodiment allows an increase in the memory size in the software implementation to be significantly suppressed.

Furthermore, preparing individual scan orders for the respective prediction modes as described in the present embodiment contributes to improving the coding efficiency. The quantized transform coefficients 121 shows the tendency to generate nonzero coefficients is biased depending on the element. The tendency to generate nonzero coefficients varies depending on the prediction direction of the intra-prediction. Moreover, with the same prediction direction, even the encoding of pixel blocks from different input images 118 leads to similar tendencies to generate nonzero coefficients. Hence, when the coefficient order control unit 113 transforms the elements into the respective one-dimensional quantized transform coefficient sequences 122 in order of decreasing occurrence probability of nonzero coefficients in the quantized transform coefficients 121, the nonzero coefficients are very likely to densely occur in the quantized transform coefficient sequence 122. This enables a reduction in the amount of code generated as a result of run length coding in the entropy encoding unit 114. As described with reference to FIG. 5A and FIG. 5B, the coefficient order control unit 113 may fixedly utilize scan orders learned for the respective prediction modes or utilize a scan order dynamically updated during the encoding process. Utilizing the scan orders optimized for the respective prediction modes, the entropy encoding unit 114 can reduce, compared to H.264, the amount of generated code based on the quantized transform coefficient sequence 122 without significantly increasing the amount of calculation.

(Second Embodiment)

An image encoding apparatus according to a second embodiment is different from the image encoding apparatus according to the first embodiment in the details of the orthogonal transformation and the inverse orthogonal transformation. The same components of the present embodiment as the corresponding components of the first embodiment are hereinafter denoted by the same reference numerals, and mainly different components will be described below. An image decoding apparatus corresponding to the image encoding apparatus according to the present embodiment will be described in a fifth embodiment.

Figure 16:
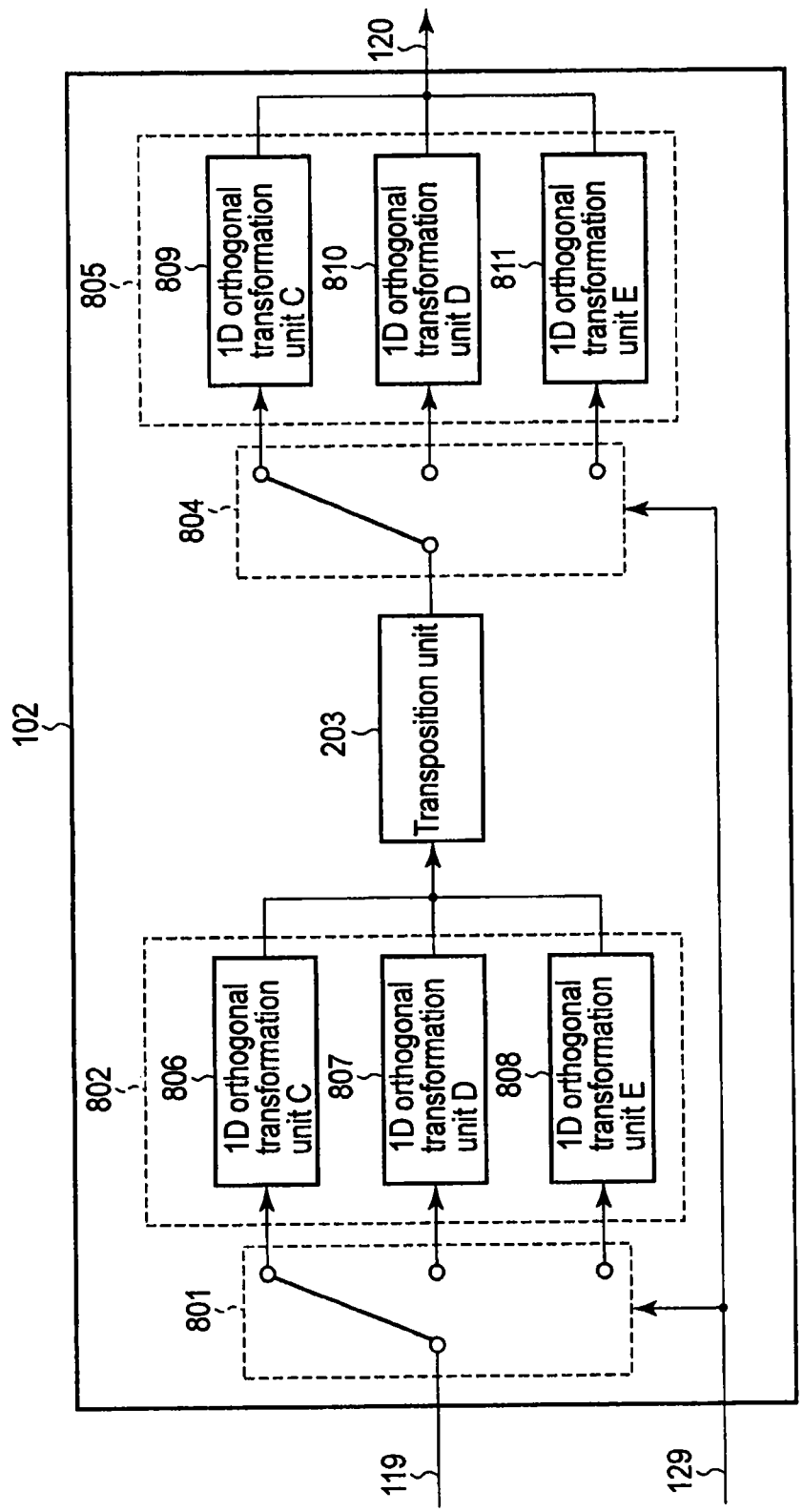
FIG. 16 is a block diagram illustrating an orthogonal transformation unit according to a second embodiment.

Instead of the orthogonal transformation unit 102 illustrated in FIG. 2, the image encoding apparatus according to the present embodiment includes the orthogonal transformation unit 102 illustrated in FIG. 16. The orthogonal transformation unit 102 in FIG. 16 includes a selection switch 801, a vertical transformation unit 802, the transposition unit 203, a selection switch 804, and a horizontal transformation unit 805. The vertical transformation unit 802 includes a 1D orthogonal transformation unit C 806, a 1D orthogonal transformation unit D 807, and a 1D orthogonal transformation unit E 808. The horizontal transformation unit 805 includes a 1D orthogonal transformation unit C 809, a 1D orthogonal transformation unit D 810, and a 1D orthogonal transformation unit E 811. The order of the vertical transformation unit 802 and the horizontal transformation unit 805 is illustrative and may be reversed.

The 1D orthogonal transformation unit C 806 and the 1D orthogonal transformation unit C 809 have common functions in that both units multiply an input matrix by a 1D transform matrix C. The 1D orthogonal transformation unit D 807 and the 1D orthogonal transformation unit D 810 have common functions in that both units multiply the input matrix by a 1D transform matrix D. The 1D orthogonal transformation unit E 808 and the 1D orthogonal transformation unit E 811 have common functions in that both units multiply the input matrix by a 1D transform matrix E.

The 1D transform matrix C, 1D transform matrix D, and 1D transform matrix E according to the present embodiment will be described below.

As described above, the prediction error 119 has a tendency to have an absolute value increasing with the distance from the reference pixel. The tendency is similarly exhibited regardless of the prediction direction. However, the prediction error in the DC prediction mode does not exhibit the tendency in the vertical direction or the horizontal direction. The present embodiment utilizes the 1D transform matrix E described below for the DC prediction mode. For the prediction modes other then the DC prediction mode, the present embodiment adaptively utilizes the 1D transform matrix C and the 1D transform matrix D depending on whether or not the tendency is present, as is the case with the first embodiment.

Specifically, the 1D transform matrix C can be generated using the same design technique as that for the above-described 1D transform matrix A. Furthermore, the 1D transform matrix D can be generated using a design technique similar to the design technique for the above-described 1D transform matrix B. That is, the 1D transform matrix D can be generated by carrying out the design technique for the 1D transform matrix B with the DC prediction mode excluded.

The 1D transform matrix E may be a matrix for DCT. Alternatively, the 1D transform matrix E may be generated by pre-designing a common transform basis so as to increase, compared to the 1D transform matrix D, the coefficient density after 1D orthogonal transformation (that is, to reduce the rate of nonzero coefficients in the quantized transform coefficients 121) in the vertical direction and the horizontal direction.

Instead of the inverse orthogonal transformation unit 105 illustrated in FIG. 3, the image encoding apparatus according to the present embodiment includes the inverse orthogonal transformation unit 105 illustrated in FIG. 17. The inverse orthogonal transformation unit 105 in FIG. 17 includes a selection switch 901, a vertical inverse transformation unit 902, the transposition unit 303, a selection switch 904, and a horizontal inverse transformation unit 905. The vertical inverse transformation unit 902 includes a 1D inverse orthogonal transformation unit C 906, a 1D inverse orthogonal transformation unit D 907, and a 1D inverse orthogonal transformation unit E 908. The horizontal inverse transformation unit 905 includes a 1D inverse orthogonal transformation unit C 909, a 1D inverse orthogonal transformation unit D 910, and a 1D inverse orthogonal transformation unit E 911. The order of the vertical inverse transformation unit 902 and the horizontal inverse transformation unit 905 is illustrative and may be reversed.

The 1D inverse orthogonal transformation unit C 906 and the 1D inverse orthogonal transformation unit C 909 have common functions in that both units multiply an input matrix by the transposed matrix of the 1D transform matrix C. The 1D inverse orthogonal transformation unit D 907 and the 1D inverse orthogonal transformation unit D 910 have common functions in that both units multiply the input matrix by the transposed matrix of the 1D transform matrix D. The 1D inverse orthogonal transformation unit E 908 and the 1D inverse orthogonal transformation unit E 911 have common functions in that both units multiply the input matrix by the transposed matrix of the 1D transform matrix E.

The 1D transform matrix set information 129 according to the present embodiment generated by the 1D transform matrix set unit 112 will be described below in detail.

The 1D transform matrix set information 129 directly or indirectly indicates the vertical transform index for selection of a transform matrix for use in vertical orthogonal transformation and vertical inverse orthogonal transformation and the horizontal transform index for selection of a transform matrix for use in horizontal orthogonal transformation and horizontal inverse orthogonal transformation. For example, the 1D transform matrix set information 129 can be expressed by a transform index (TrasformIdx) shown in FIG. 18D. Reference to the table in FIG. 18D allows the vertical transform index (Vertical Transform Idx) and the horizontal transform index (Horizontal Transform Idx) to be derived from the transform index.

As shown in FIG. 18B, a vertical transform index of "0" allows selection of the above-described 1D transform matrix C (1D_Transform_Matrix_C) or the transposed matrix thereof for vertical orthogonal transformation or vertical inverse orthogonal transformation. On the other hand, a vertical transform index of "1" allows selection of the above-described 1D transform matrix D (1D_Transform_Matrix_D) or the transposed matrix thereof for vertical orthogonal transformation or vertical inverse orthogonal transformation. Moreover, a vertical transform index of "2" allows selection of the above-described 1D transform matrix E (1D_Transform_Matrix_E) or the transposed matrix thereof for vertical orthogonal transformation or vertical inverse orthogonal transformation.

As shown in FIG. 18C, a horizontal transform index of "0" allows selection of the 1D transform matrix C (1D_Transform_Matrix_C) or the transposed matrix thereof for horizontal orthogonal transformation or horizontal inverse orthogonal transformation. On the other hand, a horizontal transform index of "1" allows selection of the 1D transform matrix D (1D_Transform_Matrix_D) or the transposed matrix thereof for horizontal orthogonal transformation or horizontal inverse orthogonal transformation. Moreover, a horizontal transform index of "2" allows selection of the 1D transform matrix E (1D_Transform_Matrix_E) or the transposed matrix thereof for horizontal orthogonal transformation or horizontal inverse orthogonal transformation.

Furthermore, FIG. 18A illustrates the index for each (intra-) prediction mode (IntraN×NPredModeIndex), the name thereof (Name of IntraN×NPredMode), and the corresponding vertical transform index and horizontal transform index. In FIG. 18A, "N×N" is indicative of the size of the prediction target block (N=4, 8, 16, or the like). The size of the prediction target block can be expanded to "M×N" (that is, rectangles other than squares).

FIG. 18E is obtained by integrating FIG. 18A and FIG. 18D together and shows the index for each prediction mode, the name of the prediction mode, and the corresponding transform index.

The 1D transform matrix set unit 112 detects the index of the prediction mode in the prediction mode information included in the prediction information 126. The 1D transform matrix set unit 112 then generates the corresponding 1D transform matrix set information 129. The tables shown in FIG. 18A, FIG. 18B, FIG. 18C, FIG. 18D, and FIG. 18E are illustrative. The 1D transform matrix set unit 112 may generate the 1D transform matrix set information 129 while avoiding the use of some or all of the tables.

For example, TransformIdx indicative of 0 means that the vertical transform index indicates 0 and that the horizontal transform index indicates 0. This means that the 1D transform matrix C is used for vertical orthogonal transformation and that the 1D transform matrix C is used for horizontal orthogonal transformation. These index values also mean that the transposed matrix of the 1D transform matrix C is used for vertical inverse orthogonal transformation and that the transposed matrix of the 1D transform matrix C is used for horizontal inverse orthogonal transformation.

TransformIdx indicative of 1 means that the vertical transform index indicates 0 and that the horizontal transform index indicates 1. This means that the 1D transform matrix C is used for vertical orthogonal transformation and that the 1D transform matrix D is used for horizontal orthogonal transformation. These index values also mean that the transposed matrix of the 1D transform matrix C is used for vertical inverse orthogonal transformation and that the transposed matrix of the 1D transform matrix D is used for horizontal inverse orthogonal transformation.

TransformIdx indicative of 2 means that the vertical transform index indicates 1 and that the horizontal transform index indicates 0. This means that the 1D transform matrix D is used for vertical orthogonal transformation and that the 1D transform matrix C is used for horizontal orthogonal transformation. These index values also mean that the transposed matrix of the 1D transform matrix D is used for vertical inverse orthogonal transformation and that the transposed matrix of the 1D transform matrix C is used for horizontal inverse orthogonal transformation.

TransformIdx indicative of 3 means that the vertical transform index indicates 2 and that the horizontal transform index indicates 2. This means that the 1D transform matrix E is used for vertical orthogonal transformation and that the 1D transform matrix E is used for horizontal orthogonal transformation. These index values also mean that the transposed matrix of the 1D transform matrix E is used for vertical inverse orthogonal transformation and that the transposed matrix of the 1D transform matrix E is used for horizontal inverse orthogonal transformation.

Here, if the prediction target block is a rectangular block expressed as M×N, the size of the block to be orthogonally transformed may also be M×N.

The table shown in FIG. 18A assigns the 1D transform matrix set information 129 taking the above-described tendency of each intra-prediction mode into account. That is, for the DC prediction mode, 2 is assigned both to the vertical transform index and to the horizontal transform index. Hence, for the DC prediction mode, the orthogonal transformation and inverse orthogonal transformation are carried out in the vertical direction and the horizontal direction using the 1D transform matrix E and the transposed matrix thereof. As a result, a high transform efficiency is achieved.

For the prediction modes other than the DC prediction mode, 0 is assigned to the vertical transform index if the tendency is exhibited in the vertical direction of the prediction error. 0 is assigned to the horizontal transform index if the tendency is exhibited in the horizontal direction of the prediction error. On the other hand, 1 is assigned to each of the directions not exhibiting the tendency. A high transform efficiency is achieved by classifying the vertical and horizontal directions of the prediction modes other than the DC prediction mode into two classes depending whether or not the tendency is present and adaptively applying the 1D transform matrix C or the 1D transform matrix D to each of the vertical and horizontal directions.

As described above, the image encoding apparatus according to the present embodiment utilizes the tendency of the intra-prediction to have a decreasing prediction accuracy with increasing distance from the reference pixel as in the case of the first embodiment, while applying the orthogonal transformation and the inverse orthogonal transformation to the DC prediction in a manner different from the manner for the other prediction modes. The image encoding apparatus classifies the vertical and horizontal directions of the prediction modes into the two classes depending whether or not the tendency is present and adaptively applies the 1D transform matrix C or the 1D transform matrix D to each of the vertical and horizontal directions. The image encoding apparatus applies the 1D transform matrix E to the DC prediction mode. The 1D transform matrix C is generated by pre-designing a common transform basis so as to increase the coefficient density after 1D orthogonal transformation (that is, to reduce the rate of nonzero coefficients in the quantized transform coefficients 121) in the direction orthogonal to the line of the group of reference pixels (vertical direction or horizontal direction). The 1D transform matrix D is generated by designing a general-purpose transform matrix having no such nature with the DC prediction mode excluded. The 1D transform matrix E may be a matrix for DCT. Alternatively, the 1D transform matrix E is generated by pre-designing a common transform basis so as to increase, for the prediction error 119 in the DC prediction mode, the coefficient density after 1D orthogonal transformation (that is, to reduce the rate of nonzero coefficients in the quantized transform coefficients 121) in the vertical direction and the horizontal direction. Hence, the image encoding apparatus according to the present embodiment achieves a higher transform efficiency than in the case where fixed orthogonal transformation such as DCT is uniformly applied to the prediction modes.

(Third Embodiment)

An image encoding apparatus according to a third embodiment is different from the image encoding apparatuses according to the first embodiment and the second embodiment in the details of the orthogonal transformation and the inverse orthogonal transformation. The same components of the present embodiment as the corresponding components of the first embodiment or the second embodiment are hereinafter denoted by the same reference numerals, and mainly different components will be described below. An image decoding apparatus corresponding to the image encoding apparatus according to the present embodiment will be described in a sixth embodiment.

Instead of the orthogonal transformation unit 102 illustrated in FIG. 2, the image encoding apparatus according to the present embodiment includes the orthogonal transformation unit 102 illustrated in FIG. 19. The orthogonal transformation unit 102 in FIG. 19 includes a selection switch 1201, a vertical transformation unit 1202, the transposition unit 203, a selection switch 1204, and a horizontal transformation unit 1205. The vertical transformation unit 1202 includes a 1D orthogonal transformation unit F 1206, a 1D orthogonal transformation unit G 1207, and a 1D orthogonal transformation unit H 1208. The horizontal transformation unit 1205 includes a 1D orthogonal transformation unit F 1209, a 1D orthogonal transformation unit G 1210, and a 1D orthogonal transformation unit H 1211. The order of the vertical transformation unit 1202 and the horizontal transformation unit 1205 is illustrative and may be reversed.

The 1D orthogonal transformation unit F 1206 and the 1D orthogonal transformation unit F 1209 have common functions in that both units multiply an input matrix by a 1D transform matrix F. The 1D orthogonal transformation unit G 1207 and the 1D orthogonal transformation unit G 1210 have common functions in that both units multiply the input matrix by a 1D transform matrix G. The 1D orthogonal transformation unit H 1208 and the 1D orthogonal transformation unit H 1211 have common functions in that both units multiply the input matrix by a 1D transform matrix H.

The 1D transform matrix F, 1D transform matrix G, and 1D transform matrix H according to the present embodiment will be described below.

As described above, the prediction error 119 has a tendency to have an absolute value increasing with the distance from the reference pixel. The tendency is similarly exhibited regardless of the prediction direction. However, the intra-prediction modes include prediction modes in which only the group of reference pixels on a line located to the left of and adjacent to the prediction target block or on a line located above and adjacent to the prediction target block is referenced (the reference pixel values are copied or interpolation is carried out using the reference pixel values) and prediction modes in which the groups of reference pixels on the line located to the left of and adjacent to the prediction target block and on the line located above and adjacent to the prediction target block are referenced. The manner in which the tendency is exhibited varies between the prediction mode for which only the group of reference pixels on one line is referenced and the prediction mode for which the groups of reference pixels on two lines are referenced. Thus, the present embodiment carries out orthogonal transformation and inverse orthogonal transformation differently between the prediction modes in which only the group of reference pixels on one line is referenced and the prediction modes in which the groups of reference pixels on two lines are referenced. Specifically, the 1D transform matrix H described below is utilized for the prediction modes in which the groups of reference pixels on two lines are referenced. On the other hand, the 1D transform matrix F and the 1D transform matrix G are adaptively utilized for the prediction modes in which only the group of reference pixels on one line is referenced, depending on whether or not the tendency is present as is the case with the first embodiment.

Specifically, the 1D transform matrix F can be generated using a design technique similar to the design technique for the above-described 1D transform matrix A. Furthermore, the 1D transform matrix F can be generated by carrying out the design technique for the above-described 1D transform matrix A while excluding the prediction modes in which the groups of reference pixels on two lines are referenced (for example, the mode 4, mode 5, and mode 6 in FIG. 7A). Furthermore, the 1D transform matrix G can be generated using the same design technique as that for the above-described 1D transform matrix B. Alternatively, the 1D transform matrix G may be a matrix for DCT.

The 1D transform matrix H may be generated by pre-designing a common transform basis so as to increase, for the prediction error 119 in the prediction modes in which the groups of reference pixels on two lines are referenced, the coefficient density after 1D orthogonal transformation (that is, to reduce the rate of nonzero coefficients in the quantized transform coefficients 121) in the vertical direction and the horizontal direction.

Figure 20:
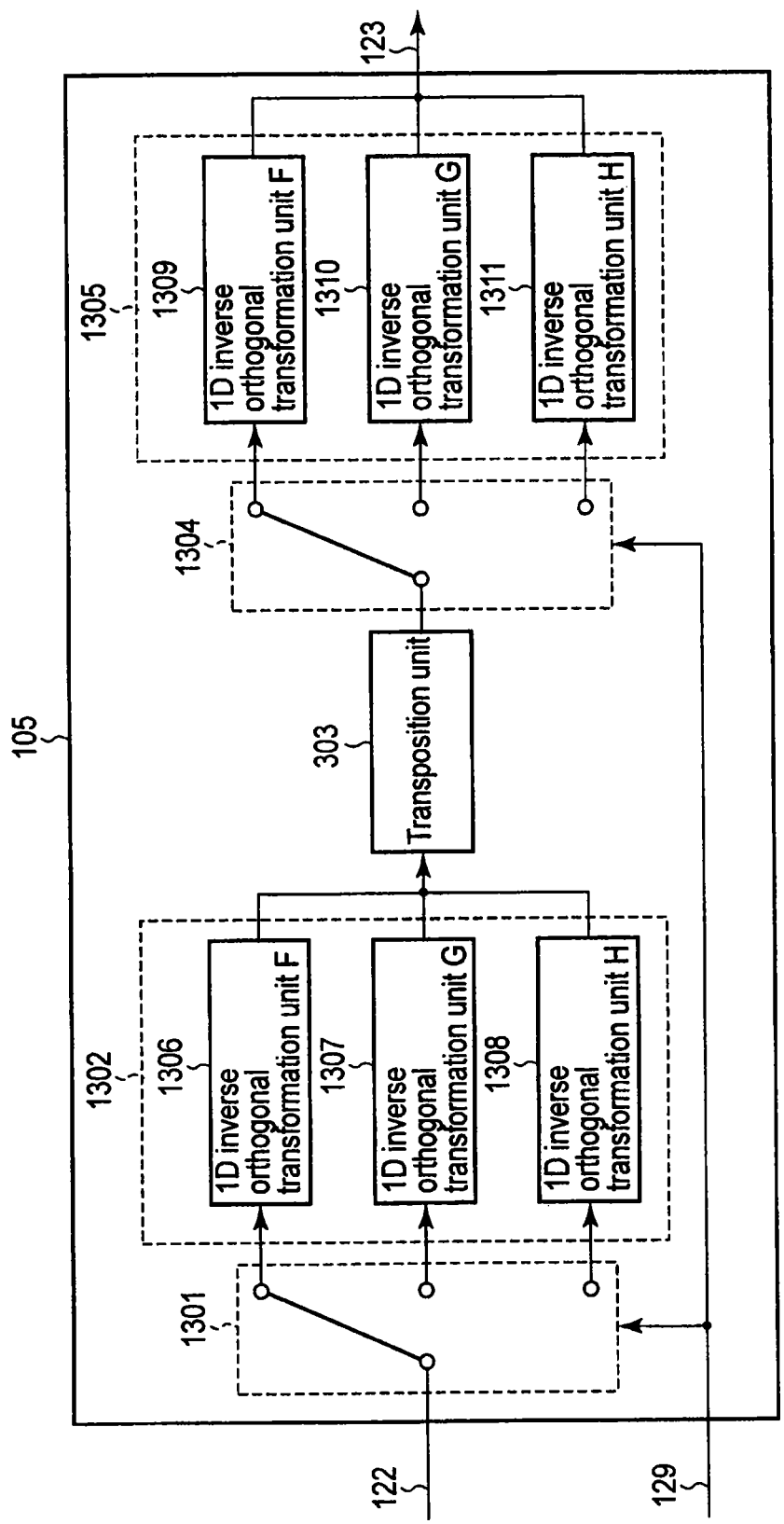
FIG. 20 is a block diagram illustrating an inverse orthogonal transformation unit according to the third embodiment.

Instead of the inverse orthogonal transformation unit 105 illustrated in FIG. 3, the image encoding apparatus according to the present embodiment includes the inverse orthogonal transformation unit 105 illustrated in FIG. 20. The inverse orthogonal transformation unit 105 in FIG. 20 includes a selection switch 1301, a vertical inverse transformation unit 1302, the transposition unit 303, a selection switch 1304, and a horizontal inverse transformation unit 1305. The vertical inverse transformation unit 1302 includes a 1D inverse orthogonal transformation unit F 1306, a 1D inverse orthogonal transformation unit G 1307, and a 1D inverse orthogonal transformation unit H 1308. The horizontal inverse transformation unit 1305 includes a 1D inverse orthogonal transformation unit F 1309, a 1D inverse orthogonal transformation unit G 1310, and a 1D inverse orthogonal transformation unit H 1311. The order of the vertical inverse transformation unit 1302 and the horizontal inverse transformation unit 1305 is illustrative and may be reversed.

The 1D inverse orthogonal transformation unit F 1306 and the 1D inverse orthogonal transformation unit F 1309 have common functions in that both units multiply an input matrix by the transposed matrix of the 1D transform matrix F. The 1D inverse orthogonal transformation unit G 1307 and the 1D inverse orthogonal transformation unit G 1310 have common functions in that both units multiply the input matrix by the transposed matrix of the 1D transform matrix G. The 1D inverse orthogonal transformation unit H 1308 and the 1D inverse orthogonal transformation unit H 1311 have common functions in that both units multiply the input matrix by the transposed matrix of the 1D transform matrix H.

The 1D transform matrix set information 129 according to the present embodiment generated by the 1D transform matrix set unit 112 will be described below in detail.

The 1D transform matrix set information 129 directly or indirectly indicates the vertical transform index for selection of a transform matrix for use in vertical orthogonal transformation and vertical inverse orthogonal transformation and the horizontal transform index for selection of a transform matrix for use in horizontal orthogonal transformation and horizontal inverse orthogonal transformation. For example, the 1D transform matrix set information 129 can be expressed by a transform index (TrasformIdx) shown in FIG. 21D. Reference to the table in FIG. 21D allows the vertical transform index (Vertical Transform Idx) and the horizontal transform index (Horizontal Transform Idx) to be derived from the transform index.

As shown in FIG. 21B, a vertical transform index of "0" allows selection of the above-described 1D transform matrix F (1D_Transform_Matrix_F) or the transposed matrix thereof for vertical orthogonal transformation or vertical inverse orthogonal transformation. On the other hand, a vertical transform index of "1" allows selection of the above-described 1D transform matrix G (1D_Transform_Matrix_G) or the transposed matrix thereof for vertical orthogonal transformation or vertical inverse orthogonal transformation. Moreover, a vertical transform index of "2" allows selection of the above-described 1D transform matrix H (1D_Transform_Matrix_H) or the transposed matrix thereof for vertical orthogonal transformation or vertical inverse orthogonal transformation.

As shown in FIG. 21C, a horizontal transform index of "0" allows selection of the 1D transform matrix F (1D_Transform_Matrix_F) or the transposed matrix thereof for horizontal orthogonal transformation or horizontal inverse orthogonal transformation. On the other hand, a horizontal transform index of "1" allows selection of the 1D transform matrix G (1D_Transform_Matrix_G) or the transposed matrix thereof for horizontal orthogonal transformation or horizontal inverse orthogonal transformation. Moreover, a horizontal transform index of "2" allows selection of the 1D transform matrix H (1D_Transform_Matrix_H) or the transposed matrix thereof for horizontal orthogonal transformation or horizontal inverse orthogonal transformation.

Furthermore, FIG. 21A illustrates the index for each (intra-) prediction mode (IntraN×NPredModeIndex), the name thereof (Name of IntraN×NPredMode), and the corresponding vertical transform index and horizontal transform index. In FIG. 21A, "N×N" is indicative of the size of the prediction target block (N=4, 8, 16, or the like). The size of the prediction target block can be expanded to "M×N" (that is, rectangles other than squares).

FIG. 21E is obtained by integrating FIG. 21A and FIG. 21D together and shows the index for each prediction mode, the name of the index, and the corresponding transform index.

The 1D transform matrix set unit 112 detects the index of the prediction mode in the prediction mode information included in the prediction information 126. The 1D transform matrix set unit 112 then generates the corresponding 1D transform matrix set information 129. The tables shown in FIG. 21A, FIG. 21B, FIG. 21C, FIG. 21D, and FIG. 21E are illustrative. The 1D transform matrix set unit 112 may generate the 1D transform matrix set information 129 while avoiding the use of some or all of the tables.

For example, TransformIdx indicative of 0 means that the vertical transform index indicates 2 and that the horizontal transform index indicates 2. This means that the 1D transform matrix H is used for vertical orthogonal transformation and that the 1D transform matrix H is used for horizontal orthogonal transformation. These index values also mean that the transposed matrix of the 1D transform matrix H is used for vertical inverse orthogonal transformation and that the transposed matrix of the 1D transform matrix H is used for horizontal inverse orthogonal transformation.

TransformIdx indicative of 1 means that the vertical transform index indicates 0 and that the horizontal transform index indicates 1. This means that the 1D transform matrix F is used for vertical orthogonal transformation and that the 1D transform matrix G is used for horizontal orthogonal transformation. These index values also mean that the transposed matrix of the 1D transform matrix F is used for vertical inverse orthogonal transformation and that the transposed matrix of the 1D transform matrix G is used for horizontal inverse orthogonal transformation.

TransformIdx indicative of 2 means that the vertical transform index indicates 1 and that the horizontal transform index indicates 0. This means that the 1D transform matrix G is used for vertical orthogonal transformation and that the 1D transform matrix F is used for horizontal orthogonal transformation. These index values also mean that the transposed matrix of the 1D transform matrix G is used for vertical inverse orthogonal transformation and that the transposed matrix of the 1D transform matrix F is used for horizontal inverse orthogonal transformation.

TransformIdx indicative of 3 means that the vertical transform index indicates 1 and that the horizontal transform index indicates 1. This means that the 1D transform matrix G is used for vertical orthogonal transformation and that the 1D transform matrix G is used for horizontal orthogonal transformation. These index values also mean that the transposed matrix of the 1D transform matrix G is used for vertical inverse orthogonal transformation and that the transposed matrix of the 1D transform matrix G is used for horizontal inverse orthogonal transformation.

Here, if the prediction target block is a rectangular block expressed as M×N, the size of the block to be orthogonally transformed may also be M×N.

The table shown in FIG. 21A assigns the 1D transform matrix set information 129 taking the above-described tendency of each intra-prediction mode into account. That is, for the prediction modes in which the groups of reference pixels on two lines are referenced, 2 is assigned both to the vertical transform index and to the horizontal transform index. Hence, for the prediction modes in which the groups of reference pixels on two lines are referenced, the orthogonal transformation and inverse orthogonal transformation are carried out in the vertical direction and the horizontal direction using the 1D transform matrix H and the transposed matrix thereof. As a result, a high transform efficiency is achieved.

For the prediction modes other than those in which the groups of reference pixels on two lines are referenced, 0 is assigned to the vertical transform index if the tendency is exhibited in the vertical direction of the prediction error. 0 is assigned to the horizontal transform index if the tendency is exhibited in the horizontal direction of the prediction error. On the other hand, 1 is assigned to each of the directions not exhibiting the tendency. A high transform efficiency is achieved by classifying the vertical and horizontal directions of the prediction modes other than those in which the groups of reference pixels on two lines are referenced, into two classes depending whether or not the tendency is present, and adaptively applying the 1D transform matrix F or the 1D transform matrix G to each of the vertical and horizontal directions.

As described above, the image encoding apparatus according to the present embodiment utilizes the tendency of the intra-prediction to have a decreasing prediction accuracy with increasing distance from the reference pixel as in the case of the first embodiment, while applying the orthogonal transformation and the inverse orthogonal transformation to the prediction modes in a manner varying depending on the number of lines corresponding to the groups of reference pixels. The image encoding apparatus classifies the vertical and horizontal directions of the prediction modes other than those in which the groups of reference pixels on two lines are referenced, into the two classes depending whether or not the tendency is present, and adaptively applies the 1D transform matrix F or the 1D transform matrix G to each of the vertical and horizontal directions. On the other hand, the image encoding apparatus applies the 1D transform matrix H to the prediction modes in which the groups of reference pixels on two lines are referenced. For the prediction modes in which only the group of reference pixels on one line is referenced, the 1D transform matrix F is generated by pre-designing a common transform basis so as to increase the coefficient density after 1D orthogonal transformation (that is, to reduce the rate of nonzero coefficients in the quantized transform coefficients 121) in the direction orthogonal to the line of the group of reference pixels (vertical direction or horizontal direction). On the other hand, the 1D transform matrix G is generated by designing a general-purpose transform matrix having no such nature. Moreover, the 1D transform matrix H is generated by pre-designing a common transform basis so as to increase, for the prediction error 119 in each prediction mode for which the group of reference pixels on two lines are referenced, the coefficient density after 1D orthogonal transformation (that is, to reduce the rate of nonzero coefficients in the quantized transform coefficients 121) in the vertical direction and the horizontal direction. Hence, the image encoding apparatus according to the present embodiment achieves a higher transform efficiency than in the case where fixed orthogonal transformation such as DCT is uniformly applied to the prediction modes.

The first to third embodiments prepare two or three types of 1D transform matrices and select one of the 1D transform matrices for vertical transformation (or vertical inverse transformation) and horizontal transformation (or horizontal inverse transformation) according to the prediction mode. However, the above-described two or three types of 1D transform matrices are illustrative. The coding efficiency can be improved by preparing more transform matrices. For example, the second embodiment and the third embodiment can be combined together to prepare four types of 1D transform matrices. However, an increased number of types of transform matrices prepared require additional hardware and the like. Thus, the balance between the coding efficiency and disadvantages resulting from an increased number of types of transform matrices desirably needs to be taken into account.

(Fourth Embodiment)

A fourth embodiment relates to an image decoding apparatus. The image encoding apparatus corresponding to the image decoding apparatus according to the present embodiment is as described in the first embodiment. That is, the image decoding apparatus according to the present embodiment decodes encoded data generated by, for example, the image encoding apparatus according to the first embodiment.

Figure 22:
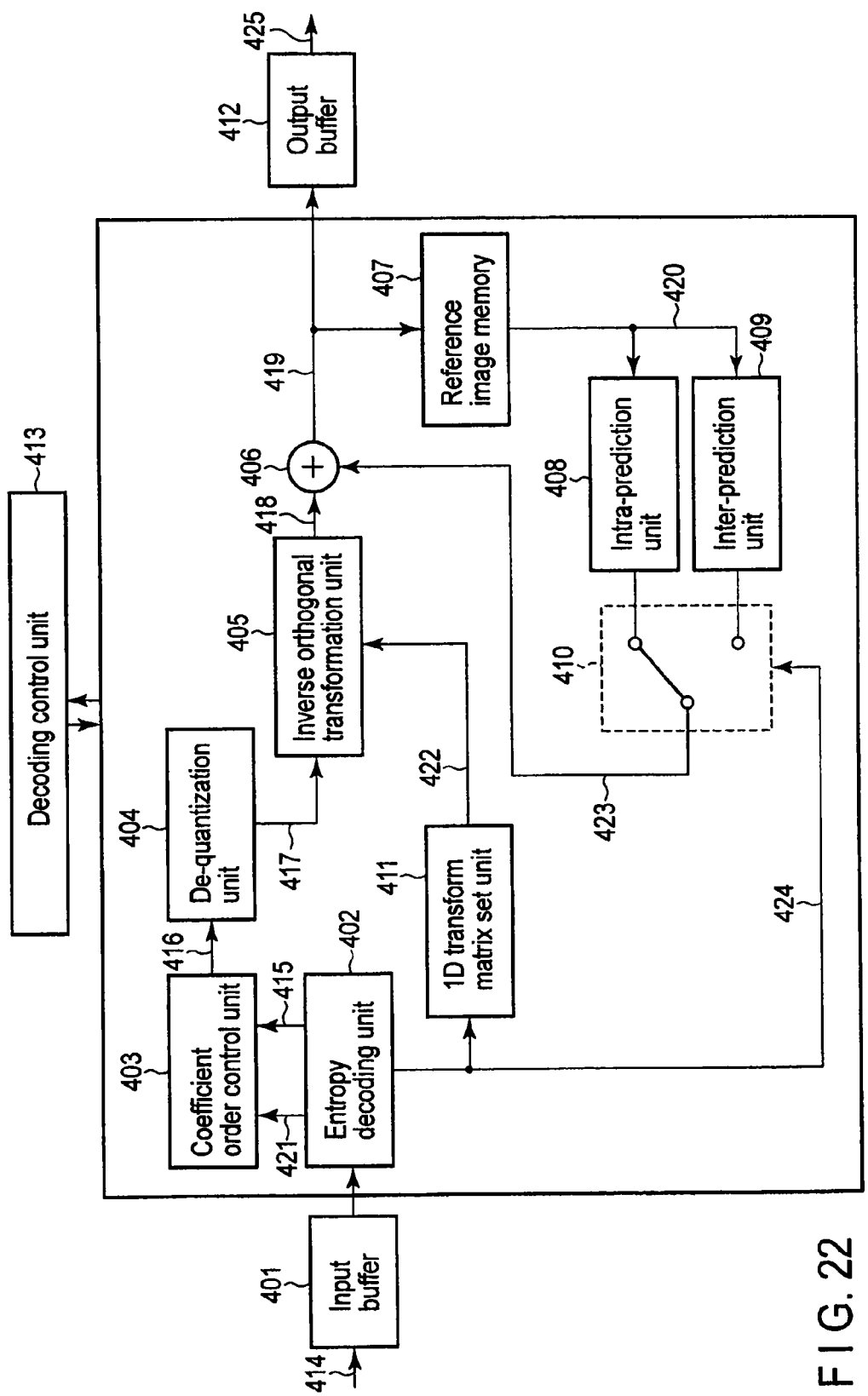
FIG. 22 is a block diagram illustrating an image decoding apparatus according to a fourth embodiment.

As shown in FIG. 22, the image decoding apparatus according to the present embodiment includes an input buffer 401, an entropy decoding unit 402, a coefficient order control unit 403, a de-quantization unit 404, an inverse orthogonal transformation unit 405, an addition unit 406, a reference image memory 407, an intra-prediction unit 408, an inter-prediction unit 409, a selection switch 410, a 1D transform matrix set unit 411, and an output buffer 412.

The image decoding apparatus in FIG. 22 decodes encoded data accumulated in the input buffer 401, accumulates a decoded image 419 in the output buffer 412, and outputs the decoded image 419 as an output image 425. The encoded data 414 is output by, for example, the image encoding apparatus in FIG. 1, and temporarily accumulated in the input buffer 401 via an accumulation system or a transmission system (not shown in the drawings).

In order to decode the encoded data 414, the entropy decoding unit 402 decodes every frame or field based on syntax. The entropy decoding unit 402 subjects each code sequence of the syntax to entropy decoding to reproduce coding parameters for the coding target block such as prediction information 424 including prediction mode information 421 and a quantized transform coefficient sequence 415. The coding parameters are required for decoding and include the prediction information 424, information on transform coefficients, and information on quantization. The quantized transform coefficient sequence 415 is input to the coefficient order control unit 403. Furthermore, the prediction mode information 421, included in the prediction information 424, is similarly input to the coefficient order control unit 403. The prediction information 424 is input to the 1D transform matrix set unit 411 and the selection switch 410.

The coefficient order control unit 403 transforms the quantized transform coefficient sequence 415 which is a one-dimensional expression into a quantized transform coefficients 416 which are a two-dimensional expression. The coefficient order control unit 403 then inputs the quantized transform coefficients 416 to the de-quantization unit 404. The coefficient order control unit 403 will be described below in detail.

The de-quantization unit 404 de-quantizes the quantized transform coefficients 416 from the coefficient order control unit 403 to obtain a restored transform coefficients 417. Specifically, the de-quantization unit 404 carries out de-quantization in accordance with the information on the quantization decoded by the entropy decoding unit 402. The de-quantization unit 404 inputs the restored transform coefficients 417 to the inverse orthogonal transformation unit 405.

The inverse orthogonal transformation unit 405 carries out an inverse orthogonal transformation corresponding to the orthogonal transformation performed on the encoding side, on the restored transform coefficients 417 from the de-quantization unit 404 to obtain a restored prediction error 418. The inverse orthogonal transformation unit 405 inputs the restored prediction error 418 to the addition unit 406.

Specifically, the inverse orthogonal transformation unit 405 according to the present embodiment is a component which is substantially the same as or similar to the inverse orthogonal transformation unit 105 in FIG. 3 and will thus not be described below in detail. In particular, the inverse orthogonal transformation unit 405 according to the present embodiment utilizes the 1D transform matrix A and 1D transform matrix B which are common to the inverse orthogonal transformation unit in FIG. 3. The restored transform coefficients 122, 1D transform matrix set information 129, and restored prediction error 123 in FIG. 3 correspond to the restored transform coefficients 417, 1D transform matrix set information 422, and restored prediction error 418 according to the present embodiment, respectively.

The addition unit 406 adds the restored prediction error 418 and the corresponding prediction image 423 together to generate the decoded image 419. The decoded image 419 is temporarily accumulated in the output buffer 412 for the output image 425 and also saved to the reference image memory 407 for a reference image 420. The decoded image 419 saved to the reference image memory 407 is referenced in frame or field units as necessary by the intra-prediction unit 408 and the inter-prediction unit 409 as the reference image 420. The decoded image 419 temporarily accumulated in the output buffer 412 is output at an output timing managed by the decoding control unit 413.

The intra-prediction unit 408, the inter-prediction unit 409, and the selection switch 410 are components which are substantially the same as or similar to the intra-prediction unit 108, inter-prediction unit 109, and selection switch 110 in FIG. 1 and will thus not be described below in detail. The decoding control unit 413 controls the components of the image decoding apparatus in FIG. 22. Specifically, the decoding control unit 413 performs various control operations for a decoding process including the above-described operations.

The 1D transform matrix set unit 411 generates the 1D transform matrix set information 422 based on the prediction mode information included in the prediction information 424 from the entropy decoding unit 402. The 1D transform matrix set unit 411 inputs the 1D transform matrix set information 422 to the inverse orthogonal transformation unit 405.

Specifically, the 1D transform matrix set unit 411 is a component which is substantially the same as or similar to the 1D transform matrix set unit 112 according to the first embodiment and will thus not be described below in detail. That is, the 1D transform matrix set unit 411 according to the present embodiment uses, for example, the tables in FIG. 4A, FIG. 4B, FIG. 4C, FIG. 4D, and FIG. 4E to generate the 1D transform matrix set information 422. The prediction information 126 and 1D transform matrix set information 129 according to the first embodiment correspond to the prediction information 424 and 1D transform matrix set information 422 according to the present embodiment, respectively.

Furthermore, the image decoding apparatus in FIG. 22 utilizes a syntax which is the same as or similar to the syntax described with reference to FIG. 11, FIG. 12, FIG. 13, and FIG. 14. Thus, the detailed description of the syntax is omitted.

The coefficient order control unit 403 will be described below in detail.

The coefficient order control unit 403 transforms the quantized transform coefficient sequence 415, which is a one-dimensional expression, into the quantized transform coefficients 416, which are a two-dimensional expression, by arranging the elements of the quantized transform coefficient sequence 415 in a predetermined order (that is, the order corresponding to the order used on the encoding side). By way of example, if the encoding side carries out 2D-1D transformation regardless of the prediction mode, the coefficient order control unit 403 can perform common 1D-2D transformation regardless of the prediction mode. Specifically, the coefficient order control unit 403 can utilize an inverse zigzag scan as is the case with H.264. The inverse zigzag scan is a 1D-2D transformation corresponding to the above-described zigzag scan.

In another example, if the encoding side carries out individual 2D-1D transformations for the respective prediction modes, the coefficient order control unit 403 can also perform individual 1D-2D transformations for the respective prediction modes. The coefficient order control unit 403 performing such an operation is illustrated in FIG. 23A. The coefficient order control unit 403 includes a selection switch 1001 and individual 1D-2D transformation units 1002, . . . , and 1010 for the respective prediction modes. In accordance with the prediction mode information (for example, the indices for the prediction modes in FIG. 4A) included in the prediction information 424, the selection switch 1001 leads the quantized transform coefficient sequence 415 to the 1D-2D transformation unit (one of 1002, . . . , and 1010) corresponding to the prediction mode. For example, a prediction mode index of 0 allows the selection switch 1001 to lead the quantized transform coefficient sequence 415 to the 1D-2D transformation unit 1002. In FIG. 23A, the prediction modes and the 1D-2D transformation units are on a one-to-one correspondence. The quantized transform coefficient sequence 415 is led to one 1D-2D transformation unit corresponding to the prediction mode. The quantized transform coefficient sequence 415 is then transformed into the quantized transform coefficients 416.

In another example, if the encoding side dynamically updates the scan order in the 2D-1D transformation, the coefficient order control unit 403 may also dynamically update the scan order in the 1D-2D transformation in a manner corresponding to the manner used on the encoding side. The coefficient order control unit 403 performing such an operation is illustrated in FIG. 23B. The coefficient order control unit 403 includes the selection switch 1001, the individual 1D-2D transformation units 1002, . . . , and 1010 for the respective nine types of prediction modes, an occurrence frequency count unit 1011, and a coefficient order update unit 1012. The selection switch 1001 is as described with reference to FIG. 23A. The individual 1D-2D transformation units 1002, . . . , and 1010 for the respective nine types of prediction modes are different from the 1D-2D transformation units in FIG. 23A in that the scan order for the 1D-2D transformation units 1002, . . . , and 1010 is updated by the coefficient order update unit 1012.

The occurrence frequency count unit 1011 creates a histogram of the number of occurrences of nonzero coefficients in each element of the quantized transform coefficient sequence 416. The occurrence frequency count unit 1011 inputs the created histogram 1013 to the coefficient order update unit 1012.

The coefficient order update unit 1012 updates the order of coefficients at a predetermined timing based on the histogram 1013. The timing may be, for example, a timing when a decoding process carried out on a coding tree unit is finished or a timing when a decoding process carried out on one line in the coding tree unit is finished.

Specifically, the coefficient order control unit 1012 references the histogram 1013 to update the order of coefficients for a prediction mode with an element for which the counted number of occurrences of nonzero coefficients is equal to or larger than a threshold. For example, the coefficient order control unit 1012 performs the updating for a prediction mode with an element for which the counted number of occurrences of nonzero coefficients is 16 or more. Setting a threshold for the number of occurrences allows the order of coefficients to be globally updated, thus avoiding convergence to a local optimum solution.

The coefficient order control unit 1012 sorts, for the updating-target prediction mode, the elements in order of decreasing occurrence frequency of nonzero coefficients. The sorting can be achieved in accordance with an existing algorithm, for example, bubble sort or quick sort. The coefficient order control unit 1012 inputs coefficient order update information 1014 indicative of the sorted order of the elements to the 1D-2D transformation unit corresponding to the updating-target prediction mode.

Once the coefficient order update information 1014 is input to the 1D-2D transformation unit, the 1D-2D transformation unit carries out a 1D-2D transformation in accordance with the updated scan order. If the scan order is dynamically updated, initial scan orders for the 1D-2D transform units need to be set which correspond to the scan order on the encoding side.

For simplification, H.264 has been illustrated and the case of the nine types of prediction modes has been described. However, even if the number of types of the prediction mode is increased to 17, 33, or the like, the individual 1D-2D transformations for the respective prediction modes can be achieved by adding 1D-2D transformation units corresponding to the prediction modes resulting from the increase.

As described above, the image decoding apparatus according to the present embodiment includes an inverse orthogonal transformation unit which is the same as or similar to the inverse orthogonal transformation unit of the image encoding apparatus according to the first embodiment. Hence, the image decoding apparatus according to the present embodiment exerts effects which are the same as or similar to the effects of the image encoding apparatus according to the first embodiment.

(Fifth Embodiment)

An image decoding apparatus according to a fifth embodiment is different from the image decoding apparatus according to the fourth embodiment in the details of the inverse orthogonal transformation. The same components of the present embodiment as the corresponding components of the fourth embodiment are hereinafter denoted by the same reference numerals, and mainly different components will be described below. The image encoding apparatus corresponding to the image decoding apparatus according to the present embodiment is as described in the second embodiment.

The inverse orthogonal transformation unit 405 according to the present embodiment is a component which is substantially the same as or similar to the inverse orthogonal transformation unit 105 in FIG. 17 and will thus not be described below in detail. In particular, the inverse orthogonal transformation unit 405 according to the present embodiment utilizes the 1D transform matrix C, 1D transform matrix D, and 1D transform matrix E which are common to the inverse orthogonal transformation unit 105 in FIG. 17. The restored transform coefficients 122, 1D transform matrix set information 129, and restored prediction error 123 in FIG. 17 correspond to the restored transform coefficients 417, the 1D transform matrix set information 422, and a restored prediction error signal 418 according to the present embodiment, respectively.

The 1D transform matrix set unit 411 according to the present embodiment is a component which is substantially the same as or similar to the 1D transform matrix set unit 112 according to the second embodiment and will thus not described below in detail. That is, the 1D transform matrix set unit 411 according to the present embodiment utilizes, for example, the tables in FIG. 18A, FIG. 18B, FIG. 18C, FIG. 18D, and FIG. 18E to generate the 1D transform matrix set information 422. The prediction information 126 and 1D transform matrix set information 129 according to the second embodiment correspond to the prediction information 424 and 1D transform matrix set information 422 according to the present embodiment, respectively.

As described above, the image decoding apparatus according to the present embodiment includes an inverse orthogonal transformation unit which is the same as or similar to the inverse orthogonal transformation unit of the image encoding apparatus according to the second embodiment. Hence, the image decoding apparatus according to the present embodiment exerts effects which are the same as or similar to the effects of the image encoding apparatus according to the second embodiment.

(Sixth Embodiment)

An image decoding apparatus according to a sixth embodiment is different from the image decoding apparatuses according to the fourth embodiment and the fifth embodiment in the details of the inverse orthogonal transformation. The same components of the present embodiment as the corresponding components of the fourth embodiment or the fifth embodiment are hereinafter denoted by the same reference numerals, and mainly different components will be described below. The image encoding apparatus corresponding to the image decoding apparatus according to the present embodiment is as described in the third embodiment.

The inverse orthogonal transformation unit 405 according to the present embodiment is a component which is substantially the same as or similar to the inverse orthogonal transformation unit 105 in FIG. 20 and will thus not be described below in detail. In particular, the inverse orthogonal transformation unit 405 according to the present embodiment utilizes the 1D transform matrix F, 1D transform matrix G and 1D transform matrix H which are common to the inverse orthogonal transformation unit 105 in FIG. 20. The restored transform coefficients 122, 1D transform matrix set information 129, and restored prediction error 123 in FIG. 20 correspond to the restored transform coefficients 417, 1D transform matrix set information 422, and restored prediction error signal 418 according to the present embodiment, respectively.

The 1D transform matrix set unit 411 according to the present embodiment is a component which is substantially the same as or similar to the 1D transform matrix set unit 112 according to the third embodiment and will thus not described below in detail. That is, the 1D transform matrix set unit 411 according to the present embodiment utilizes, for example, the tables in FIG. 21A, FIG. 21B, FIG. 21C, FIG. 21D, and FIG. 21E to generate the 1D transform matrix set information 422. The prediction information 126 and 1D transform matrix set information 129 according to the third embodiment correspond to the prediction information 424 and 1D transform matrix set information 422 according to the present embodiment, respectively.

As described above, the image decoding apparatus according to the present embodiment includes an inverse orthogonal transformation unit which is the same as or similar to the inverse orthogonal transformation unit of the image encoding apparatus according to the third embodiment. Hence, the image decoding apparatus according to the present embodiment exerts effects which are the same as or similar to the effects of the image encoding apparatus according to the third embodiment.

The fourth to sixth embodiments prepare two or three types of 1D transform matrices and select one of the 1D transform matrices for vertical inverse transformation and horizontal inverse transformation according to the prediction mode. However, the above-described two or three types of 1D transform matrices are illustrative. The coding efficiency can be improved by preparing more transform matrices. For example, the fifth embodiment and the sixth embodiment can be combined together to prepare four types of 1D transform matrices. However, an increased number of types of transform matrices prepared require additional hardware and the like. Thus, the balance between the coding efficiency and disadvantages resulting from an increased number of types of transform matrices desirably needs to be taken into account.

Modifications of the embodiments will be listed and introduced below.

The first to sixth embodiments describe the example in which a frame is divided into rectangular blocks with a 16×16 pixel size or the like and in which encoding or decoding is carried out on each block in order from upper left to lower right in the picture (see FIG. 6A). However, the encoding order and the decoding order are not limited to this example. For example, the encoding and decoding may be carried out in order from lower right to upper left or spirally from the center to the end of the picture. Moreover, the encoding and decoding may be carried out in order from upper right to lower left or spirally from the end to the center of the picture.

The first to sixth embodiments illustrate the prediction target block sizes such as the 4×4 pixel block, the 8×8 pixel block, and the 16×16 pixel size for description. However, the prediction target block need not necessarily have a uniform block shape. For example, examples of the prediction target block size may include a 16×8 pixel block, an 8×16 pixel block, an 8×4 pixel block, or a 4×8 pixel block. Furthermore, not all the blocks within one coding tree unit need to have the same block size, and a plurality of different block sizes may be adopted together within the coding tree unit. If a plurality of different block sizes are adopted together within the coding tree unit, the increased number of blocks into which the coding tree unit is divided increases the amount of code required to encode or decode division information. Thus, the block size is desirably selected taking into account the balance between the amount of code for the division information and the quality of the local decoded image or decoded image.

For simplification, the first to sixth embodiments comprehensively describe the color signal components without distinguishing luminance signals from color difference signals. However, if the prediction process varies between the luminance signal and the color difference signal, the same prediction scheme or different prediction schemes may be used. If different prediction schemes are used for the luminance signal and for the color difference signal, the prediction scheme selected for the color difference signal can be encoded or decoded in a manner similar to the manner for the luminance signal.

For simplification, the first to sixth embodiments comprehensively describe the color signal components without distinguishing the luminance signal from the color difference signal. However, if the orthogonal transformation process varies between the luminance signal and the color difference signal, the same orthogonal transformation scheme or different orthogonal transformation schemes may be used. If different orthogonal transformation schemes are used for the luminance signal and for the color difference signal, the orthogonal transformation scheme selected for the color difference signal can be encoded or decoded in a manner similar to the manner for the luminance signal.

As described above, each of the embodiments achieves efficient orthogonal transformation and inverse orthogonal transformation while alleviating difficulties in the hardware implementation and the software implementation. Hence, each embodiment improves the coding efficiency and thus subjective image quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, a program can be provided which is stored in a computer readable storage medium and configured to implement the processing according to each of the embodiments. The storage medium may be in any storage format provided that the program can be stored in the storage medium and read from the storage medium by a computer; the storage medium may be a magnetic disk, an optical disc (CD-ROM, CD-R, DVD, or the like), a magneto-optical disk (MO or the like), a semiconductor memory, or the like.

Furthermore, the program configured to implement the processing according to each of the embodiments may be stored in a computer (server) connected to a network such as the Internet. Thus, the program may be downloaded into a computer (client) via the network.

What is claimed is:

1. An image decoding method, comprising:
    decoding transform coefficients for a target image to be decoded and information indicating an intra-prediction mode for the target image;
    scanning the transform coefficients to generate scanned transform coefficients;
    setting a combination of a vertical inverse transform matrix and a horizontal inverse transform matrix corresponding to the target image based on a predetermined relation;
    inversely transforming the scanned transform coefficients along a vertical direction and a horizontal direction using the combination of the vertical inverse transform matrix and the horizontal inverse transform matrix when the intra-prediction mode is a first mode or second mode, to obtain a prediction error, both of the first mode and the second mode being other than (1) a third mode corresponding to the vertical direction or (2) a fourth mode corresponding to the horizontal direction, the first mode comprising at least a fifth mode corresponding to a first diagonal direction, a sixth mode corresponding to a second diagonal direction, and a seventh mode corresponding to a third diagonal direction; and
    generating a decoded image based on the prediction error, wherein the combination corresponds to any of a plurality of candidate combinations including a first candidate combination and a second candidate combination, both of the vertical inverse transform matrix and the horizontal inverse transform matrix are a first transform matrix in the first candidate combination when the intra-prediction mode is the first mode, and both of the vertical inverse transform matrix and the horizontal inverse transform matrix are a second transform matrix in the second candidate combination when the intra-prediction mode is the second mode, the first transform matrix being different from the second transform matrix.

* * * * *